US008655632B2

(12) United States Patent
Moguchaya

(10) Patent No.: US 8,655,632 B2
(45) Date of Patent: Feb. 18, 2014

(54) GRIDLESS GEOLOGICAL MODELING

(75) Inventor: Tatiana Moguchaya, Oslo (NO)

(73) Assignee: Schlumberger Technology Corporation, Sugar Land, TX (US)

(*) Notice: Subject to any disclaimer, the term of this patent is extended or adjusted under 35 U.S.C. 154(b) by 926 days.

(21) Appl. No.: 12/703,805

(22) Filed: Feb. 11, 2010

(65) Prior Publication Data
US 2011/0054857 A1 Mar. 3, 2011

Related U.S. Application Data

(60) Provisional application No. 61/239,468, filed on Sep. 3, 2009.

(51) Int. Cl.
G06G 7/48 (2006.01)
(52) U.S. Cl.
USPC .............................................. 703/6
(58) Field of Classification Search
CPC .................. G06F 17/5018; G06F 17/5009
USPC ............................ 703/2, 6, 9, 10
See application file for complete search history.

(56) References Cited

U.S. PATENT DOCUMENTS

| | | | |
|---|---|---|---|
| 4,817,059 A | | 3/1989 | Hornby et al. |
| 5,229,976 A | * | 7/1993 | Boyd et al. ............... 367/73 |
| 5,963,879 A | | 10/1999 | Woodward et al. |
| 6,106,561 A | | 8/2000 | Farmer |
| 6,256,603 B1 | * | 7/2001 | Celniker ................... 703/10 |
| 6,823,297 B2 | | 11/2004 | Jenny et al. |
| 7,340,385 B2 | | 3/2008 | James |
| 7,496,488 B2 | | 2/2009 | Jenny et al. |
| 7,516,056 B2 | | 4/2009 | Wallis et al. |
| 7,542,037 B2 | | 6/2009 | Fremming |
| 7,684,967 B2 | | 3/2010 | Wallis et al. |
| 7,716,028 B2 | | 5/2010 | Montaron et al. |
| 7,716,029 B2 | | 5/2010 | Couet et al. |

(Continued)

FOREIGN PATENT DOCUMENTS

WO 2009018450 A1 2/2009

OTHER PUBLICATIONS

Hoppe, H.;, "Smooth view-dependent level-of-detail control and its application to terrain rendering," Visualization '98. Proceedings, vol., no., pp. 35-42, Oct. 24-24, 1998.*

(Continued)

Primary Examiner — Kamini S Shah
Assistant Examiner — Luke Osborne
(74) Attorney, Agent, or Firm — Lam Nguyen; Rodney Warfford

(57) ABSTRACT

Systems and methods perform gridless geological modeling. A system provides an interactive visual model that performs fast modeling of subsurface geological properties without spending processor resources calculating a three-dimensional grid. The system receives structural data, selects points for modeling a property of a subsurface earth volume, and propagates values for the property directly to the points in gridless three-dimensional space. The system then displays the propagated values in an interactive visualization of a structural framework model. The system creates fast interpolation functions and can apply a callback function for acceleration. One technique offloads calculations to a graphics processor or other auxiliary processor for speed. The system provides a myriad of fully interactive volume and dimensional slice probes, with mappable color-coding and a user-selection of rendering styles. Points are quality checked and optimized propagation parameters are stored for accelerated rendering when unavoidable grid production is needed for simulation.

20 Claims, 35 Drawing Sheets
(22 of 35 Drawing Sheet(s) Filed in Color)

(56) References Cited

U.S. PATENT DOCUMENTS

| | | |
|---|---|---|
| 2005/0015231 A1 | 1/2005 | Edwards et al. |
| 2006/0047429 A1 | 3/2006 | Adams |
| 2006/0265204 A1 | 11/2006 | Wallis et al. |
| 2007/0010979 A1 | 1/2007 | Wallis et al. |
| 2009/0084545 A1* | 4/2009 | Banerjee et al. ......... 166/250.15 |
| 2009/0234625 A1 | 9/2009 | Zangl et al. |
| 2009/0319242 A1 | 12/2009 | Lee et al. |
| 2011/0106507 A1* | 5/2011 | Lepage ............................ 703/2 |

OTHER PUBLICATIONS

Anthony Bush, Anthony Bush's Blog "Blog Archive" Re: Boost performance with parallel processing, posted Saturday, Jan. 31, 2009, http://anthonybush.com/blog/tag/parallel-processing/, retrieved Sep. 27, 2012, 2 pages.*

R. Sieber, C. Schmid, and S. Wiesman. Smart Legend—Smart Atlas. In Proc. XXII Int. Carto Conf. (ICC2005), 2005. 9 pages.*

* cited by examiner

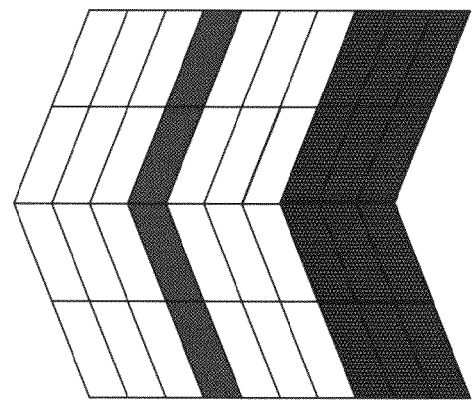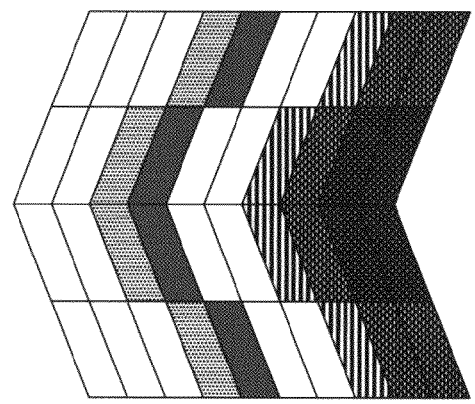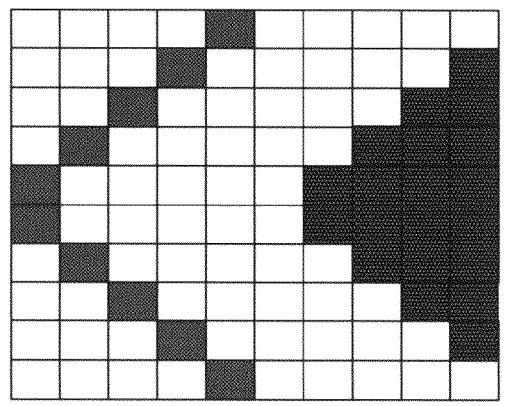
FIG. 3

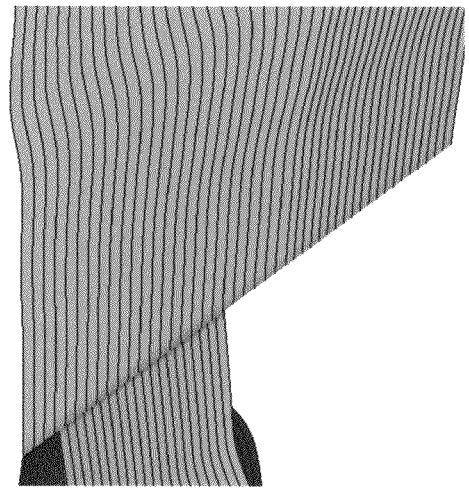
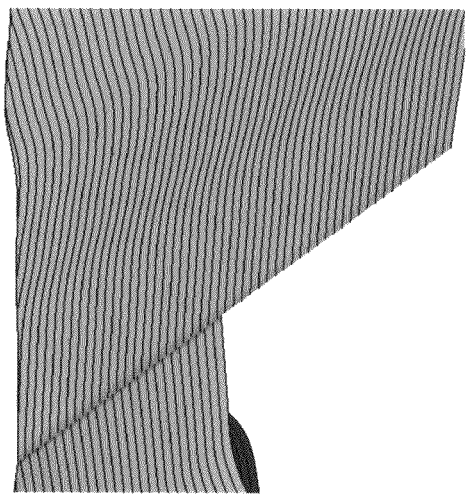
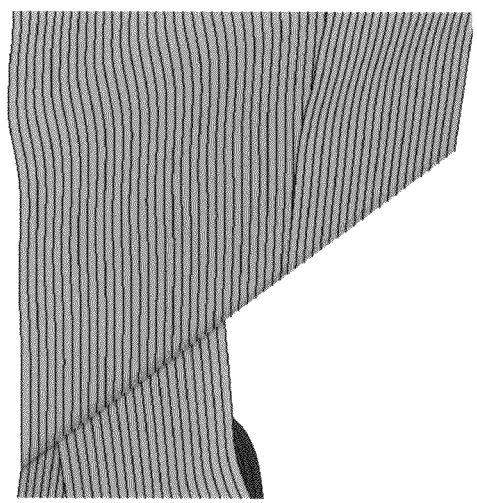
FIG. 6

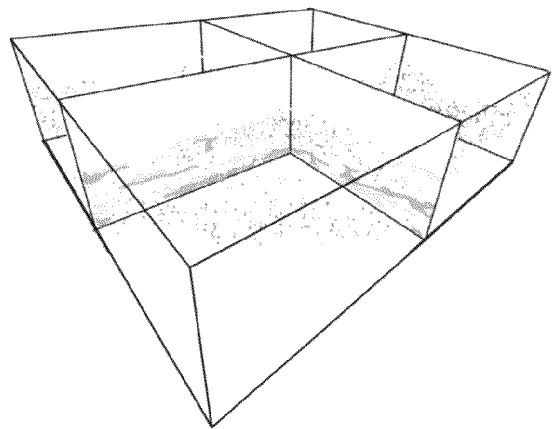
XY PLANES 2102
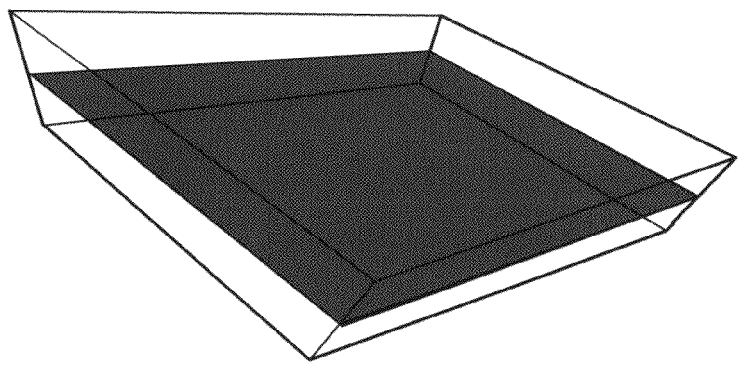
Z PLANE 2104
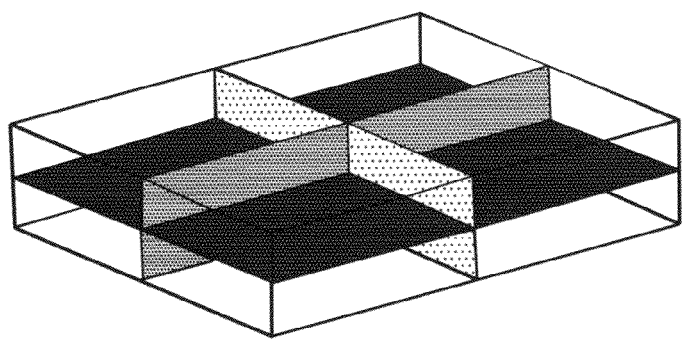
XYZ PLANES 2106
FIG. 21

FIG. 22 INITIAL COLOR MAPPING

GRIDLESS GEOLOGICAL MODELING

RELATED APPLICATIONS

This patent application claims priority to U.S. Provisional Patent Application No. 61/239,468 to Tatiana Moguchaya, entitled, "Gridless Geological Modeling," filed Sep. 3, 2009, and incorporated herein by reference in its entirety.

BACKGROUND

A conventional geologic model, as used in the oil and gas industry, is a computer-based representation of a subsurface earth volume, such as a petroleum reservoir or a depositional basin. Technology for three-dimensional (hereinafter "3-dimensional" or 3D) geological modeling or static reservoir modeling continues to advance.

Seismic-to-simulation is the process of generating three-dimensional models of hydrocarbon reservoirs for predicting production, selecting well placement, and optimizing reservoir management. The resulting three-dimensional model should faithfully represent original well logs, seismic data, and production history.

Building the three-dimensional grid is the most difficult part of the seismic-to-simulation workflow. The process is extremely expensive in terms of user time and is considered to be an art. Moreover, the corner-point grid contains intrinsic limitations in terms of the degree of structural complexity that can be reproduced.

The upstream oil and gas industry thus struggles with creating efficient grids and the tools to work with them. The following disadvantages of constructing the theoretical grids are evident:

- Building a three-dimensional grid requires an initial step consisting of a large amount of manual work. All of the subsequent steps are dependent upon this initial manual stage.
- Typical grids have up to 50 million cells. In a standard workflow a single iteration requires that values be calculated for all of the cells. This may require between ten seconds and ten hours depending on the grid size and the algorithm being used.
- In the three-dimensional grid, the space coordinates I, J, K are integer values, so everything can appear chunky. X and Y values are converted to I and J values as though the grid cells were perfectly square. They are not, so property distribution is very dependent upon the grid shape.
- Many of the new versions of the three-dimensional grid are optimized for simulation rather than property modeling. This introduces quite serious limitations in terms of complexity of faulting.
- In addition, developments in seismic interpretation, such as automatic fault extraction and cluster technology, and developments in simulation, such as parallelization and use of unstructured grids, can overload the modeling step.
- A standard three-dimensional grid-based modeling exercise requires several iterations. In a single iteration, the user must specify parameters for the property propagation, while the process calculates values for each cell in the model, potentially tens of millions. A quality check must be performed on the result by looking at layers and cross sections, adjusting the parameters and potentially recalculating. If the three-dimensional grid is changed, then the model needs to be recreated. Such iteration may take several minutes and even then only a small percentage of the millions of cells in which the property has been calculated are displayed during the step of quality checking.
- Corner-point grids always require a compromise of true fidelity to the actual geological structure. Structural framework models contain only geological horizons and faults and not subdivision into cells, and so are not compromised to the same extent as corner-point grids. Ideally, property population would be done on the structural framework.

What is needed is way to derive the benefits of a corner-point grid model from a structural framework model, without having to compute the corner-point grid.

SUMMARY

Systems and methods perform gridless geological modeling. A system provides an interactive visual model that performs fast modeling of subsurface geological properties without spending processor resources calculating a three-dimensional grid. The system receives structural data, selects points for modeling a property of a subsurface earth volume, and propagates values for the property directly to the points in gridless three-dimensional space. The system then displays the propagated values in an interactive visualization of a structural framework model. The system creates fast interpolation functions and can apply a callback function for acceleration. One technique offloads calculations to a graphics processor or other auxiliary processor for speed. The system provides a myriad of fully interactive volume and dimensional slice probes, with mappable color-coding and a user-selection of rendering styles. Points are quality checked and optimized propagation parameters are stored for accelerated rendering when unavoidable grid production is needed for simulation.

This summary section is not intended to give a full description of gridless geological modeling, or to provide a comprehensive list of features and elements. A detailed description with example implementations follows.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 3 is a diagram demonstrating how a stratigraphic model grid rectifies seismic data in a three-corner point grid.

FIG. 6 is a diagram demonstrating estimation of K layers in chronostratigraphic (Wheeler) space, the relative stratigraphic age of each layer.

FIG. 21 is a diagram of an example Graphical User Interface displaying various combinations of interactive intersection planes for browsing the gridless geological model.

DETAILED DESCRIPTION

Overview

Figure 1:
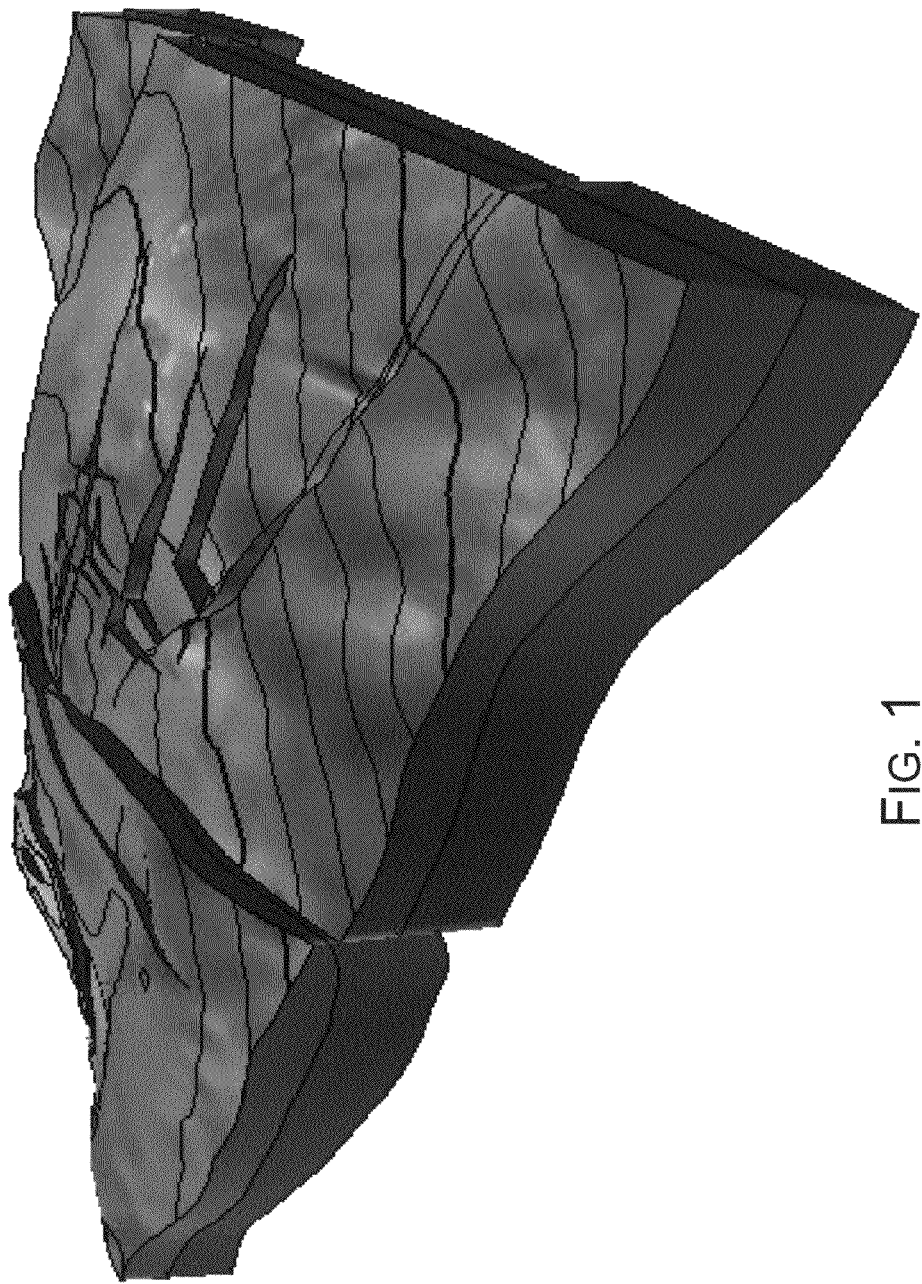
FIG. 1 is a diagram of an example structural framework geological model.

This disclosure describes systems and methods for gridless geologic modeling. Systems described herein propagate physical properties of a subsurface earth volume directly into gridless three-dimensional (3-dimensional) space without generating a grid or calculating values for all its cells. This allows the gridless modeling to use a structural model that represents the subsurface earth volume, without performing processor-intensive grid generating computations until a theoretical grid model is really needed for simulation or other processes.

Gridless geological modeling is almost always performed in color. Most of the visual information visible to a user of a gridless model is color-coded, with the color conveying a significant amount of information. The illustrations for a patent, however, are generally black and white. Thus, most of the FIGURES included herein, are black and white renderings of a color model. When a visual gradient is encountered in the FIGURES, the reader should assume a visual variation between different colors, each color designating a value from a range of color-coded values.

The innovative systems and methods described herein work from a structural framework model to provide many of the benefits of a corner-point grid model, without having to generate the computationally expensive corner-point grid itself. Moreover, in one implementation the system enables a quality checking step on the physical property values generated in gridless three-dimensional space. Then, when the grid is needed, the grid cells can be populated quickly and reliably with propagated values because a reliable sample of the values has already been pre-checked.

In addition to the rapid property modeling, the gridless modeling allows early pre-screening of the geological model (property modeling on time-converted well data) and efficient validation of the regular structural model.

The systems and methods for gridless geological modeling also provide the following advantages:

Geological grids are no longer required for many tasks. The geologist can create a multi-resolution virtual property model using the initial structural framework.

The system is truly scalable—property modeling and quality checking can be independent from filling grid cells with property values.

Properties modeled are grid independent, offering flexibility so that the Cartesian X coordinate creates the property model, and the Cartesian Y coordinate can create a grid optimized for simulation.

Gridless modeling provides improved seismic interpretation.

The gridless modeling provides rapid "what-if" (hypothetical) scenario testing.

The desired "what-If" scenario testing can support "live" models that are always dynamically up to date and are conditioned to all the known data in real time.

Gridless modeling enables enhanced utilization of seismic advances (i.e., accommodates semi-automatic interpretation, which increases model complexity) and supports advances in simulation (it is possible to simulate on larger models with unstructured grids).

The system localizes calculations instead of performing comprehensive global calculations, calculating values at a resolution appropriate to the region of interest. Modeling can be performed at any point, creating "virtual" properties. Quality check is performed only on the values visible at one time, and these can be calculated on the fly depending on viewing mode (two or three-dimensional), camera position (near-far and angle of view), current stratigraphy, and available computer resources. Thousands of points are calculated rather than millions, and the gain in speed can be used to make the process interactive. The calculated points to be visualized can be modeled interactively in volume probes, plane intersections, surfaces, in cross plots, etc.

A property (for example, soil permeability) can be modeled as a visual slice or intersection on the model. The property is calculated at points on the slice or intersection at a coarse resolution. Based on the angle of view a further refining of the resolution can be performed by calculating more values to visualize closer to the apparent camera. Various values for the property being modeled are color-coded. Thus, a visual slice through a modeled earth volume shows a color map of the property as it exists in the earth volume.

The virtual nature of the virtual properties makes them ideal for parallel processing, when available. The settings to distribute properties can be stored in a database, and when the simulation grid is constructed, these can be applied and the several million values calculated remotely.

Thus, a volume probe, intersection plane, or other modeling operation can be executed on the fly, localizing calculations instead of performing comprehensive calculations for the entire model. From one frame of reference, pseudo-cells of a hypothetical grid are isolated for interactive display purposes and an interpolator can return the grid values at those locations.

Localizing calculations for gridless geological modeling and quickly interpolating virtual properties in this gridless manner enables new and interactive user interfaces for viewing selected properties of a subsurface earth volume.

For example, the gridless modeling can provide key features of new user interfaces for presentation of geological structural models and three-dimensional grids include:
- interactive volume probes
- interactive dimensional slice operations
- interactive color map filters
- interactive histograms which may also be combined as suitable in various implementations of a gridless modeling system.

A volume probe can be inserted to view a region of interest in the working model, thereby modifying the visible portion of the data volume.

Ability to present a volume probe also makes it efficient to add visual intersection planes in the three available dimensions of a specified rectangular coordinate system. Through the model, these can be browsed interactively in the corresponding coordinate directions.

A predefined color map can be associated with each volume probe or intersection plane. The color map and the predefined values for data minimum and maximum thresholds can be changed by editing the map interactively. Editing the color map provides a kind of viewing filter.

An interactive histogram can be obtained through a picking operation, e.g., selecting an arbitrary point on the object displayed on the screen or picking on a volume probe to return the profile along the pick ray, which is a list of the values of all the volume cells intersected by the pick ray.

The following terminology is used in the description or is otherwise informative.

3D grid—A corner point 3D grid suitable for geological modeling and flow simulation.

Corner point grid—A flexible grid structure where the eight corners of a cell (the nodes) can be moved to from irregular cell geometries.

Fault—A planar rock fracture, which shows evidence of relative movement. Large faults within the Earth's crust are the result of shear motion and active fault zones are the causal locations of most earthquakes. Earthquakes are caused by energy release during rapid slippage along faults. Since faults do not usually consist of a single, clean fracture, the term fault zone is used when referring to the zone of complex deformation that is associated with the fault plane.

Horizon in 3D Grid—A geological surface in the 3D grid. It can have multiple Z values at a single XY value, as a result, reverse faults can be accounted for.

Intersection—A plane or "slice" which data can be displayed. This may be a plane in any direction, model grid lines, seismic lines or well paths.

Model—A grid or group of grids based on the same fault structure and boundaries.

Pillars—Vertical lines connecting the corner points of 3D grid cells.

Pillar Gridding—The process of building pillars between fault pillars to create a 3D grid. Quality check of the result is done using the grid skeleton and intersections. The grid holds no layering information at this point.

Property Models—Data on petrophysical properties held within each cell of a 3D grid.

Seismic Cube—A 3D subvolume extracted from the seismic data.

Well Logs—A detailed record of the geologic formations penetrated by a borehole. The log may be based either on visual inspection of samples brought to the surface (geological logs) or on physical measurements made by instruments lowered into the hole (geophysical logs). Well logging is done when drilling boreholes for oil and gas, groundwater, minerals, and for environmental and geotechnical studies.

Zone—A volume between two horizons.

Example Environment

In one implementation, gridless geological modeling uses the "geological structural model" (FIG. 1), which is typically modeled as a set of horizons and faults, to provide some advantages of the "reservoir model" (FIG. 2), which is modeled as a three-dimensional corner-point grid, but the gridless geological modeling does so without assuming some of the disadvantages of the reservoir model.

Since gridless geological modeling systems can use the geological structural model of FIG. 1 as a base or foundation, some aspects of such structural frameworks are now presented.

Figure 2:
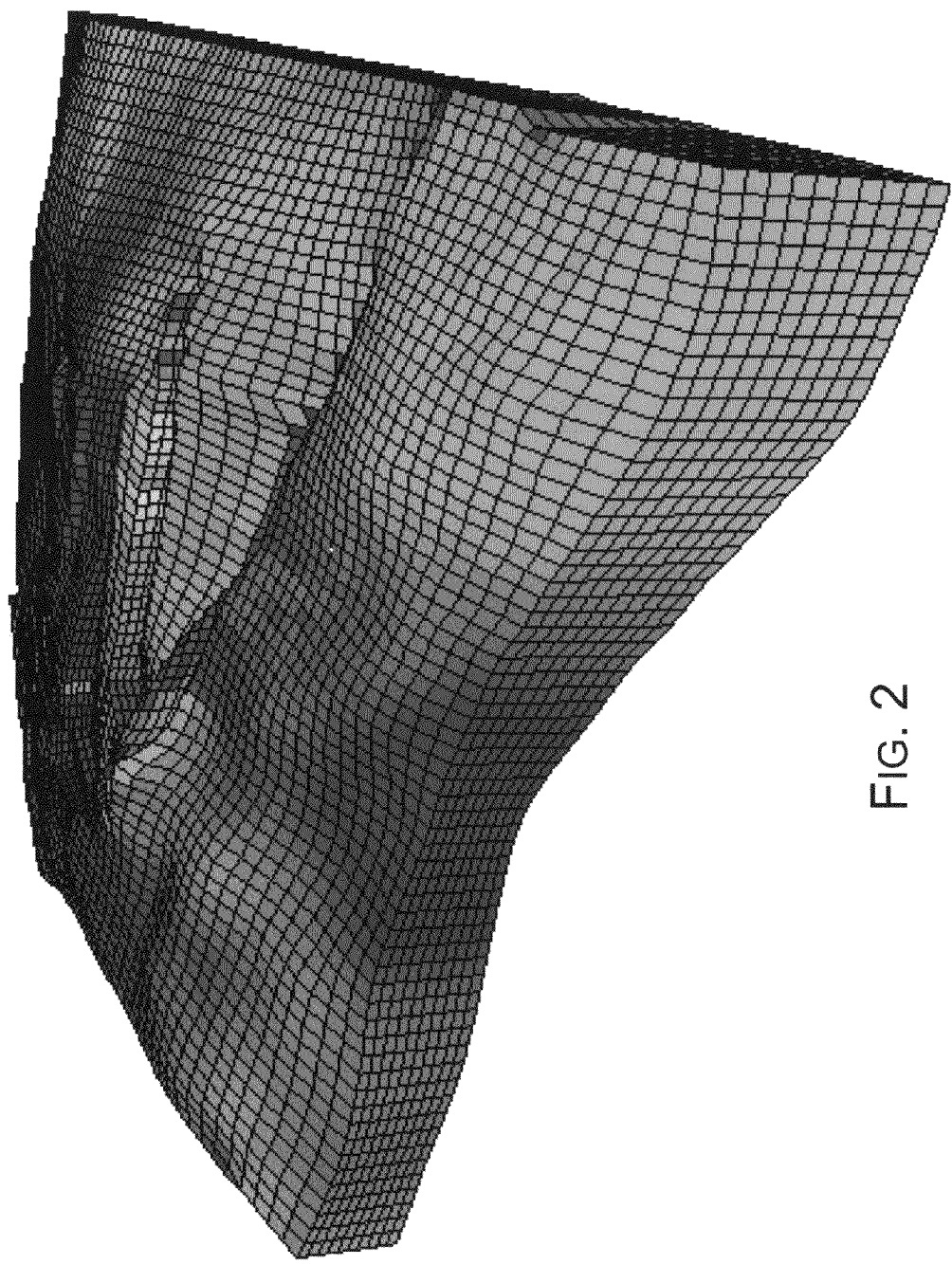
FIG. 2 is a diagram of an example three-dimensional grid.

In the corner-point grid of a reservoir model, such as that in FIG. 2, a set of straight lines defined by their end points define the pillars of the corner-point grid. The pillars have a lexiographical ordering that determines adjacent pillars. On each pillar, a constant number of nodes (corner-points) is defined. A corner-point cell is the volume between four neighboring pillars and two neighboring vertical points on each of the four pillars.

Each cell can be identified by integer coordinates (i, j, k), where the k coordinate runs along the pillars, and i and j span each layer. The cells are ordered naturally, where the index i runs the fastest and k the slowest. In the special case of all pillars being vertical, the top and bottom face of each corner-point cell are described by bilinear surfaces and the side faces are planes. Corner-point grids are supported by most reservoir simulation computer programs, and has become an oil and gas industry standard.

In FIG. 3, a "seismic grid" 300 is a grid construct based on uniform data samples, e.g., raw data from the field. A corresponding corner-point 302 grid consists of an array of irregular cells that aims to depict the current lay of the current geological layers and rock formations, the lithology. If seismic readings from the seismic grid 300 are directly transferred from the seismic grid 300 format to the corner-point grid format 302, the results are inaccurate, as illustrated. By using a stratigraphic model grid 304, e.g., in which various layers are corrected back to an approximation of the horizontally isotropic layering at time of deposition, the seismic data can be accurately represented in a geologic model.

Geologic Modeling

Geological models are created for many different purposes, such as determining the locations of wells, estimating hydrocarbon reserves, or planning reservoir-development strategies, but common to all of them is a desire to build a representation of the subsurface. Depending on the purposes, different aspects of the model may be important.

In the case of a regional exploration model the shape of the structures may be most important. Geological models may be used to achieve accurate volume calculations or to test the effect of different depositional regimes against observed data. With simulation models, the size and complexity may be the limiting factors in achieving a model that provides a good history match.

Three-Dimensional Grid Concept

In the industry, all grid modeling methods consist of modeling a three-dimensional grid as a collection of cubic cells deformed to fit horizons and aligned in pillars along faults.

It is assumed that the earth material within a grid cell is essentially homogenous. Each cell thus has a single rock type, one value of porosity, one value of water saturation, etc. These are referred to as the cell's properties. The assumption of homogeneity is a simplification over the true case, but allows generating a representation of reality that can be used in different practical calculations.

Grid Structure

The inclusion or exclusion of faults is a key decision in the model building process. When dealing with simulation, the faults may be critical as flow barriers or conduits and can be the key control on results. For volume calculations, faults may also be important in defining the geometry of the reservoir. Including faults, however, requires a number of decisions to be made regarding their inclusion in the grid and will increase the time taken to create the model.

Once faults are included there is also the question of the extent of their inclusion. Including every discontinuity in the model makes the model unmanageable and at some point fractures are better modeled as modified properties as opposed to breaks in structure.

Grid Resolution

The resolution of the grid is a key decision when building the model. A high resolution grid has a high density of cells, which may allow creating great spatial complexity but may also result in a model that has too many cells, which may be cumbersome to use since each process takes a long time. A lower resolution grid has less scope for complexity but works quickly and allows the user to test many possibilities quickly.

The resolution decision depends on the purpose of the model, the detail and amount of data available. There is little point in creating a model with higher resolution horizontally or vertically than the data available for modeling. It is often wise to begin with a coarse model, test the effects of changes, and then increase the resolution as parameters become more certain.

Property Modeling

Modeled physical properties are part of the three-dimensional grid. The process of assigning property values in between well logs, based on information from the logs is called property modeling. Layering in the geological model guides property modeling—the layering indicates geologically equivalent layers, i.e., isosurfaces of equivalent geological time.

Figure 4:
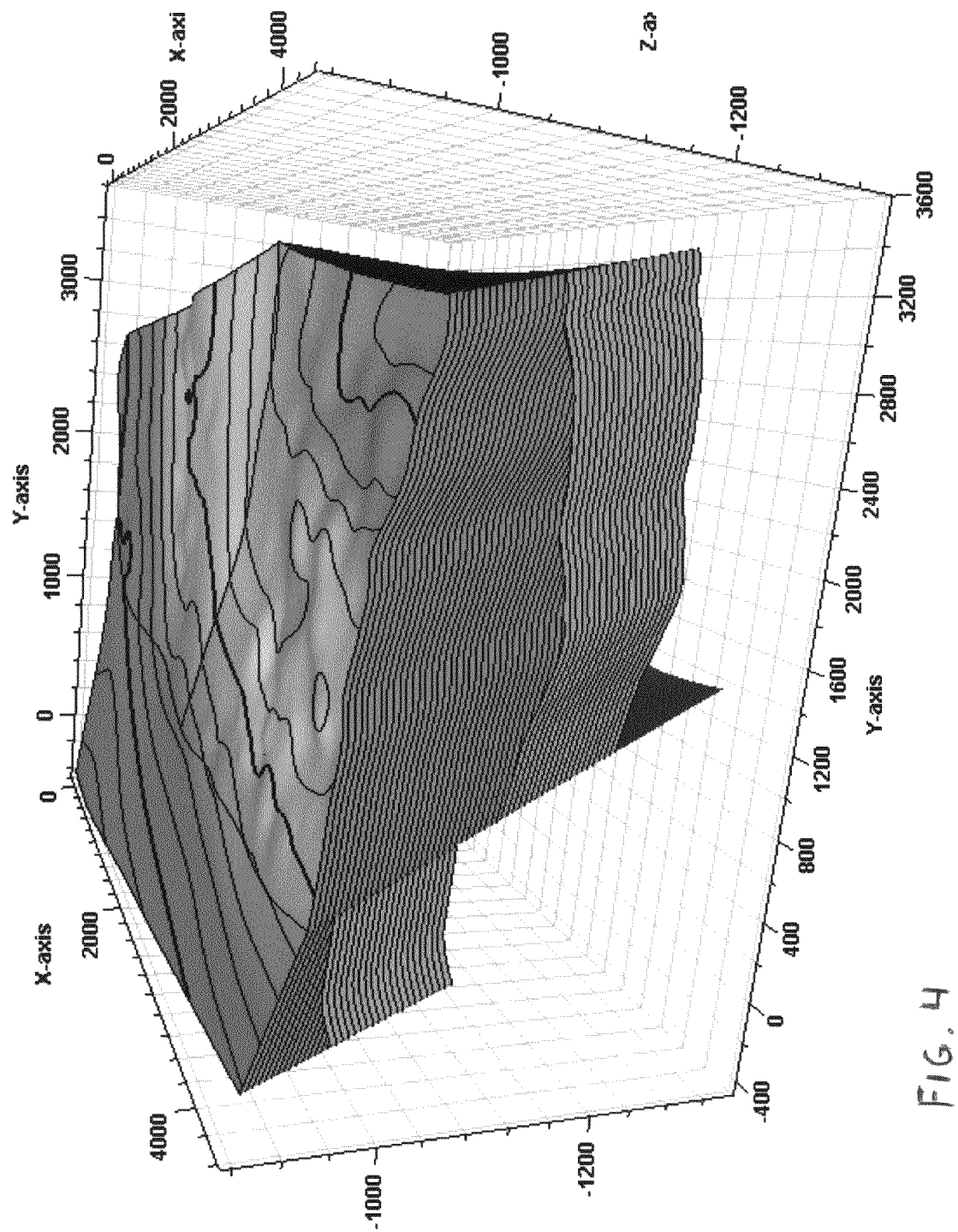
FIG. 4 is a diagram of an example faulted geological model.

Consider a simple model with a fault, shown in FIG. 4. In the lower zone, layering follows the base. The zone is then eroded and faulted before the upper zone is deposited, filling the space caused by faults.

Cells in the same layer have similar properties because they were deposited during the same geological event. Adjacent cells in the same layer across the fault have similar properties because when they were deposited the fault did not exist. In the model being constructed, these may now be significantly displaced horizontally as well as vertically.

Pillar Gridding

To define a three-dimensional mesh, based on the given geological model, a pillar gridding process is used. The pillars themselves are normal to the local displacement, i.e., parallel to the faults, and therefore inherently describe the lateral movement of rock volumes around the fault. Simply, adjacency in the grid indicates adjacency during deposition, even when the adjacent cells are displaced by a fault.

Wheeler Space

The next goal is a transformation from any XYZ point within the structural model to an IJK point in the Wheeler space (chronostratigraphy). As the layers in the model represent equal geological time, then switching to a view where the layers are flat and equally spaced gives a three-dimensional Wheeler diagram (IJK space).

Figure 5:
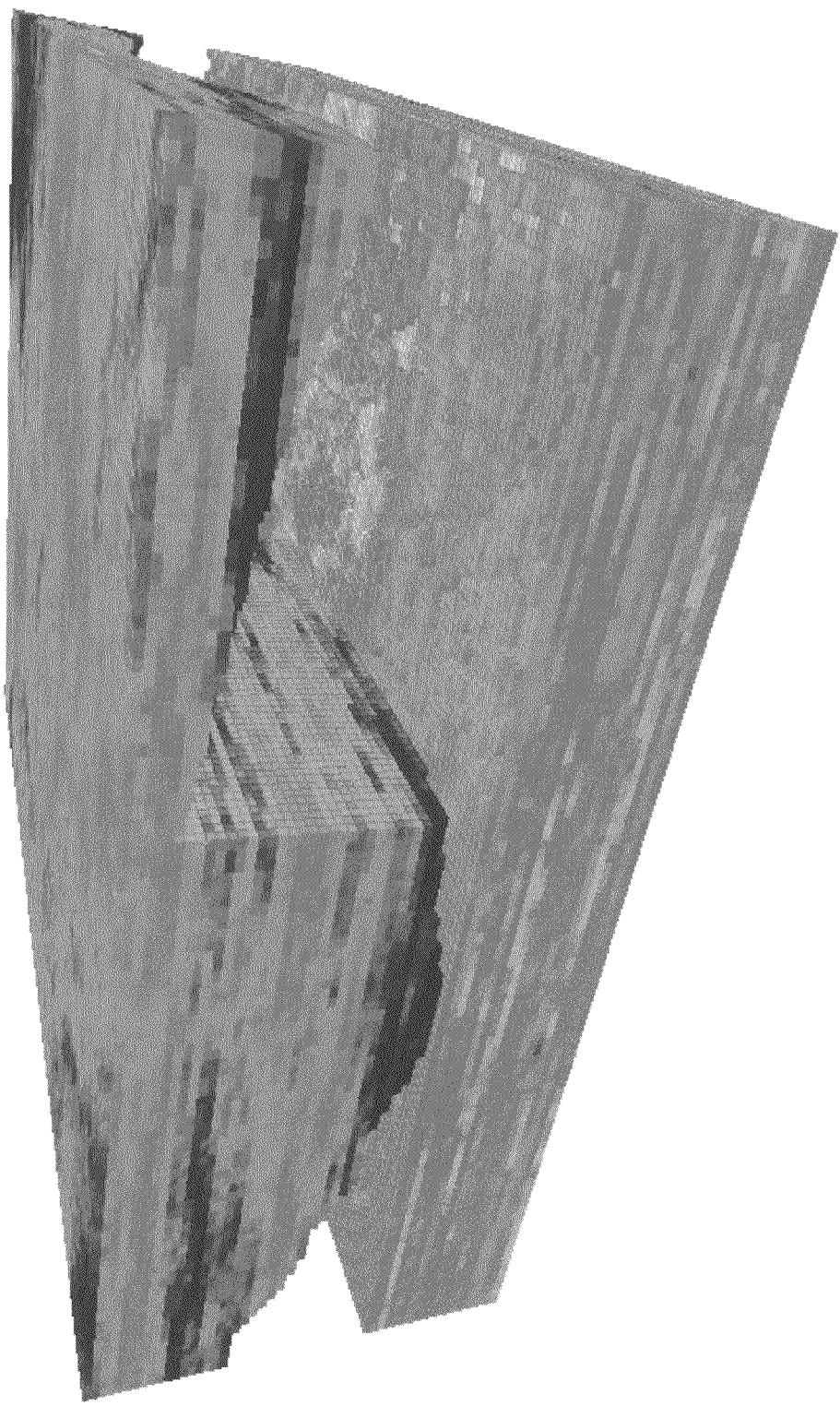
FIG. 5 is a diagram of an earth volume rendered in a Wheeler diagram (GOCADS GEOCHRON Model, CoCads Research Group, Nancy, France).

In Wheeler space, the vertical axis is geological time and all faulting and deformation has been removed. Horizontally, each layer appears as it did when it was deposited. There are empty spaces in the model (FIG. 5) representing areas where no deposition took place or where the material deposited has been eroded.

In this view all of the features are expected to be flat. Property modeling is simple because the axes of the continuity follow the grid, and vertical variability is greater than horizontal variability. Geological bodies that would have been disjointed by faulting in a three-dimensional space are regular and continuous. Seismic interpretation is easy because the interpreter is looking for flat features rather than faulted/deformed reflectors.

Estimating K

In Wheeler space the isochrones, represented by K, are relatively easy to recreate in the structural model because they are normally either parallel to the top or base of a geological zone or proportional to the zone thickness depending on whether the deformation occurred before, after, or during deposition (FIG. 6). Where faults occur the zone boundary must be extrapolated so that it can guide the layering, which is relatively straightforward.

In short, the relative stratigraphic age within the zone at a point XYZ can be calculated using a basic function—distance from the top or the base.

Figure 7:
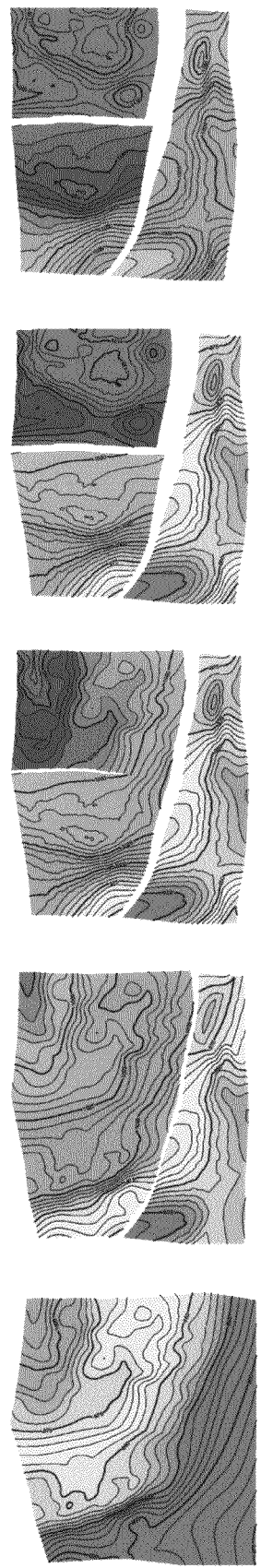
FIG. 7 is a diagram demonstrating estimation of an IJ surface in chronostratigraphic space.

Estimating IJ

Where there are no faults, the K layer is complete and the XY coordinates can in effect be used as IJ. As shown in FIG. 7, where a fault exists, the edges of the appropriate K layer must be stretched and sewn together to ensure that areas that were adjacent before faulting are adjacent in IJK space. If the fault is reverse then the edges overlap and must be squeezed back. Where multiple faults intersect all the edges must be sewn together. These deformations must be distributed smoothly across the surface and must also show a smooth transition vertically between surfaces if the transformation to IJK space is to be useful.

Example Gridless Modeling Environment

Figure 8:
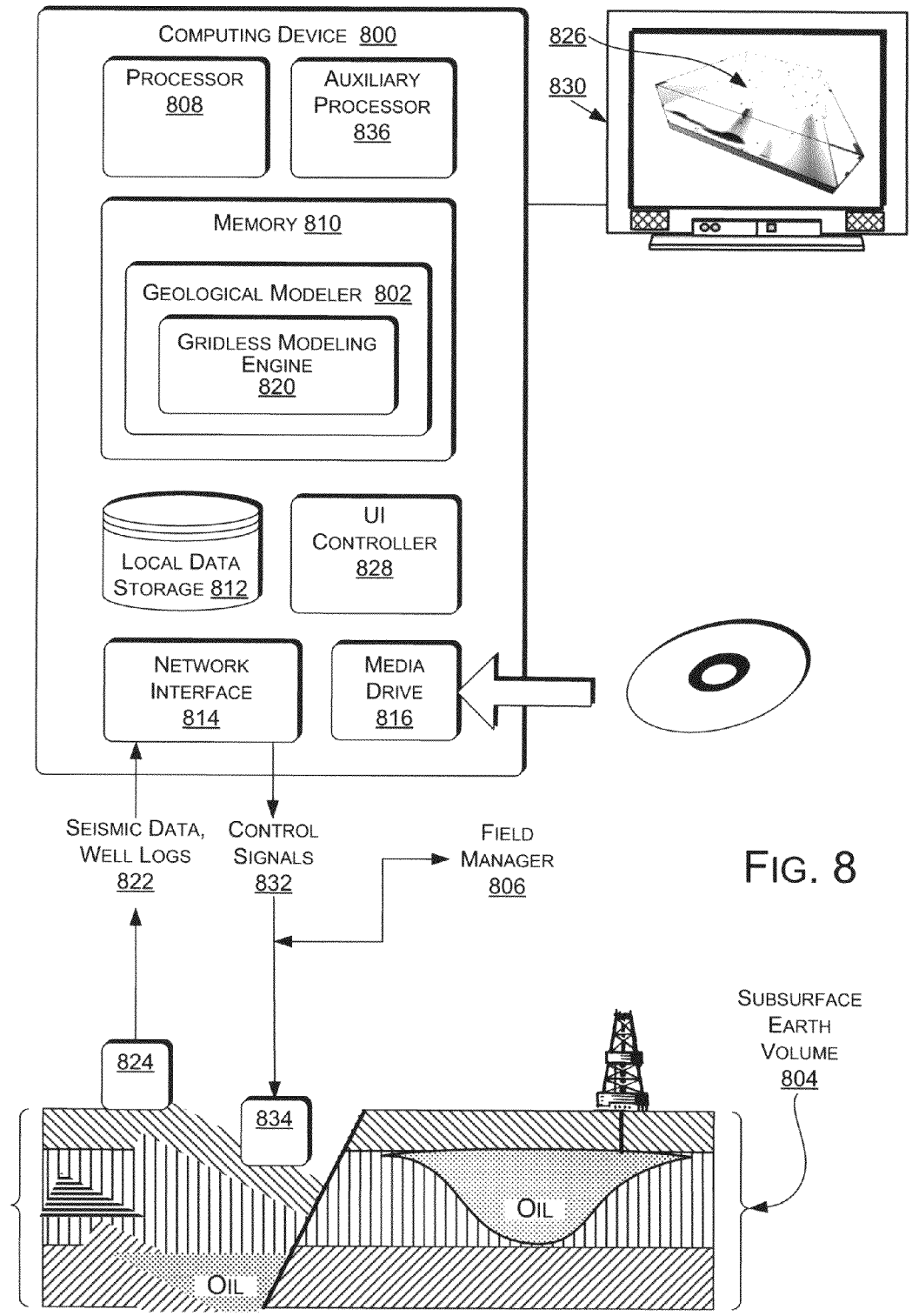
FIG. 8 is a block diagram of an example computing environment and field application environment for gridless geological modeling.

FIG. 8 shows an example system that performs gridless geological modeling. A computing device 800 implements a component, such as an innovative geological modeler 802, that models or otherwise analogizes a subsurface earth volume, such as a petroleum reservoir or a depositional basin. The geological modeler 802 can perform both gridded and gridless modeling. The geological modeler 802 is illustrated as software, but can be implemented as hardware or as a combination of hardware and software instructions.

In the illustrated example, the computing device 800 is communicatively coupled via sensory and control devices with a real-world "subsurface earth volume" 804, i.e., an actual earth volume, petroleum reservoir, depositional basin, oilfield, wells, surface control network, etc., and usually also in communication with one or more human agents, such as a geologist, monitor, field manager 806, etc. Although the computing device 800 is shown specifically in communication with a petroleum resource, the computing device 800 may be in communication with any subsurface earth volume, since the subsurface volume being modeled may only be a candidate for petroleum production or other use.

The computing device 800 may be a computer, computer network, or other device that has a processor 808, memory 810, data storage 812, and other associated hardware such as a network interface 814 and a media drive 816 for reading and writing a removable storage medium 818. The removable storage medium 818 can be, for example, a compact disk (CD); digital versatile disk/digital video disk (DVD); flash drive, etc. The geological modeler 802 includes a gridless modeling engine 820, either integrated as part of the fabric of the geological modeler 802; as a separate module in communication with the geological modeler 802; or as a retrofit module added on, for example, to an updated version of the geological modeler 802.

The removable storage medium 818 may include instructions for implementing and executing the gridless modeling engine 820. At least some parts of the gridless modeling engine 820 can be stored as instructions on a given instance of the removable storage medium 818, removable device, or in local data storage 812, to be loaded into memory 810 for execution by the processor 808.

Although the illustrated geological modeler 802 is depicted as a program residing in memory 810, a geological modeler 802 may be implemented as hardware, such as an application specific integrated circuit (ASIC) or as a combination of hardware and software.

In this example system, the computing device 800 receives field data, such as seismic data and well logs 822 from a connected device 824 in communication with, and collecting data from, geophones or other sensors for a potential petroleum field or other subsurface earth volume 804 via the network interface 814. The geological modeler 802 operates on a structural framework model of the subsurface earth volume 804. A structural framework model (e.g., FIG. 1) does not include a mathematically generated grid construct, but is based on horizons and faults. The gridless modeling engine 820, upon a user's modeling request, propagates a collection of values representing (one or more) physical properties of the subsurface earth volume 804 in the gridless three-dimensional space of a gridless model that is based on the structural framework model (FIG. 1). A user interface controller 828 displays the gridless model user interface 826 on a display 830. The gridless modeling engine 820 may perform other modeling operations and generate useful user interfaces via the user interface controller 828, including novel interactive graphics, without generating a grid structure.

Based on action of the gridless modeling engine 820, the geological modeler 802 can generate control signals 832 to be used via control devices 834 in real world prospecting, modeling, exploration, prediction, and/or control of resources, such as petroleum production, including direct control via hardware control devices 834 of such machinery and hardware as injection and production wells, reservoirs, fields, transport and delivery systems, and so forth.

The computing device 800 may also include an auxiliary processor 836 to perform operations (e.g., value propagation) that can be offloaded from the processor 808 or the geological modeler 802. That is, when propagating values in gridless three-dimensional space, implementations of the gridless modeling engine 820 can utilize the auxiliary processor 836 for bulk computations to accelerate the gridless modeling. This is described in greater detail, further below.

Example Engine

Figure 9:
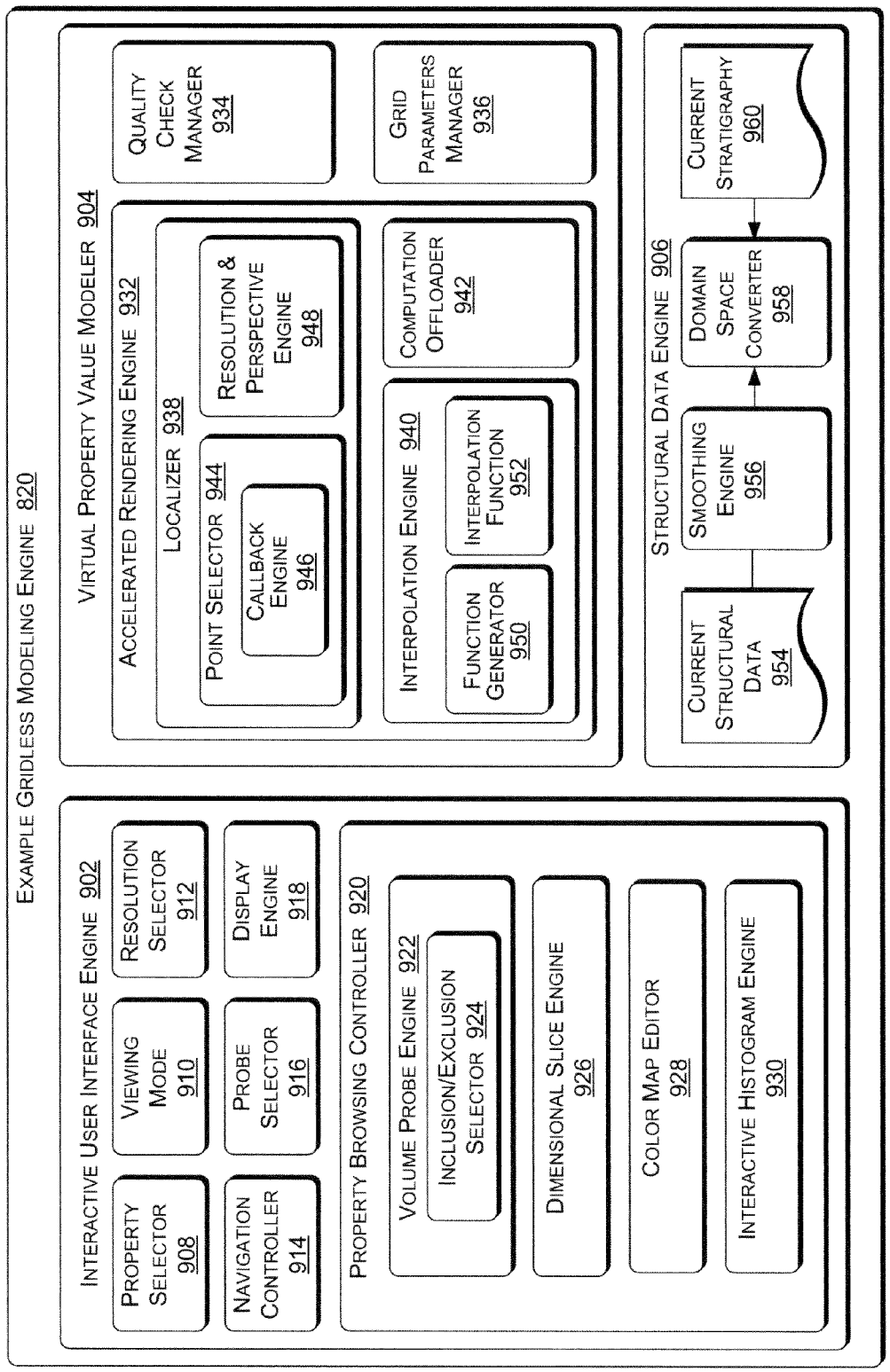
FIG. 9 is a block diagram of an example gridless modeling engine.

FIG. 9 shows an example gridless modeling engine 820. The illustrated implementation is only one example configuration, to introduce features and components of an engine that performs innovative gridless modeling. The components may bear different names when the configuration changes, and different components may also be used. Many other arrangements of the components of a gridless modeling engine 820 are possible within the scope of the subject matter. As introduced above, the gridless modeling engine 820 can be implemented in hardware, or in combinations of hardware and software. Illustrated components are communicatively coupled with each other for communication as needed.

A list of example components for the illustrated implementation of the gridless modeling engine 820 includes an interactive user interface engine 902, a virtual property value modeler 904, and a structural data engine 906.

The interactive user interface engine 902 includes a property selector 908, a view mode selector 910 (e.g., 2-dimensional view or 3-dimensional view), a resolution selector 912, a navigation controller 914, a probe selector 916, a display engine 918, and a property browsing controller 920.

The property browsing controller 920, which enables the user to interact with the displayed model, includes various tools for investigating the geological and petrophysical properties displayed in the gridless model: a volume probe engine 922 that enables the user to visualize a selected volume within the overall volume of the displayed gridless model; an inclusion/exclusion selector 924, that determines whether the selected volume is displayed, or alternatively, visually eliminated (cut-away); a dimensional slice engine 926 that enables the user to view a sectional plane within the displayed gridless model; a color map editor 928 that enables the user to visually filter the property values, which in one implementation of the displayed gridless model are color-coded; and an interactive histogram engine 930 that enables the user to tabulate the concentration of different property values in a single visual histogram graphic.

The virtual property value modeler 904 includes an accelerated rendering engine 932, a quality check manager 934, and a grid parameters manager 936.

The accelerated rendering engine 932 includes a localizer 938, an interpolation engine 940, and a computation offloader 942.

The localizer 938 further includes a point selector 944, a callback engine 946, and a resolution & perspective engine 948 that decides the number of points to calculate and display depending on a visual object's distance from an apparent camera viewpoint. The interpolation engine 940 further includes a function generator 950 and an interpolation function 952.

The structural data engine 906 includes a database of current structural data 954, a smoothing engine 956, a domain space converter 958, and a database storing current stratigraphy 960 (e.g., stored in a database).

The illustrated components of the example gridless modeling engine 820 represent one way to organize and arrange the functions and features of gridless modeling techniques into interrelated components, but do not exclude other arrangements of the same or similar components.

Operation of the Example Engine

The gridless modeling engine 820 performs property modeling based on the structural data 954 of a current structural framework model in use, with raw or noisy data being normalized by the smoothing engine 956 as needed, and based on a selected current stratigraphy 960.

Figure 10:
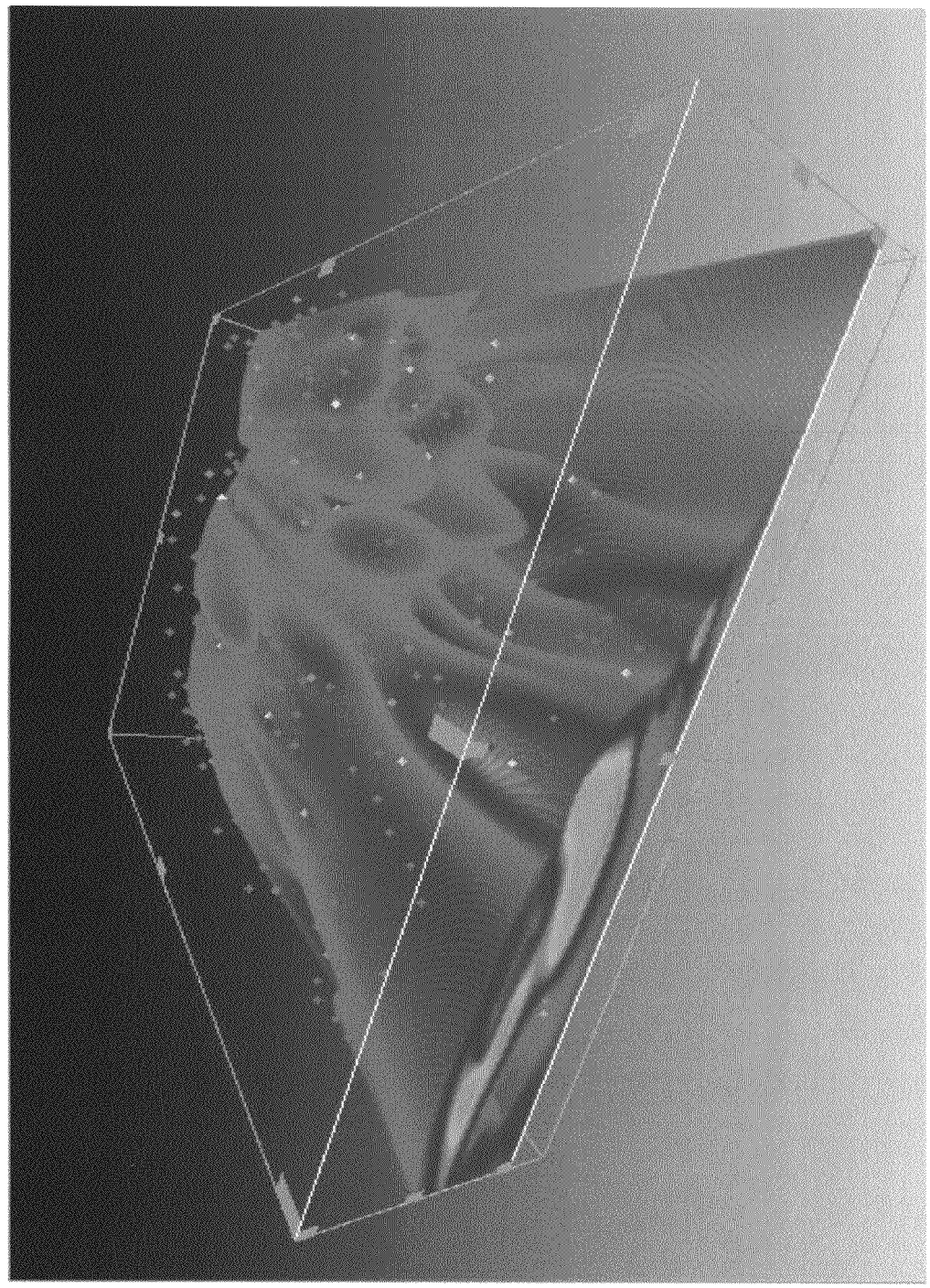
FIG. 10 is a diagram of an example gridless geological model, showing localized calculations within a volume probe.
Figure 11:
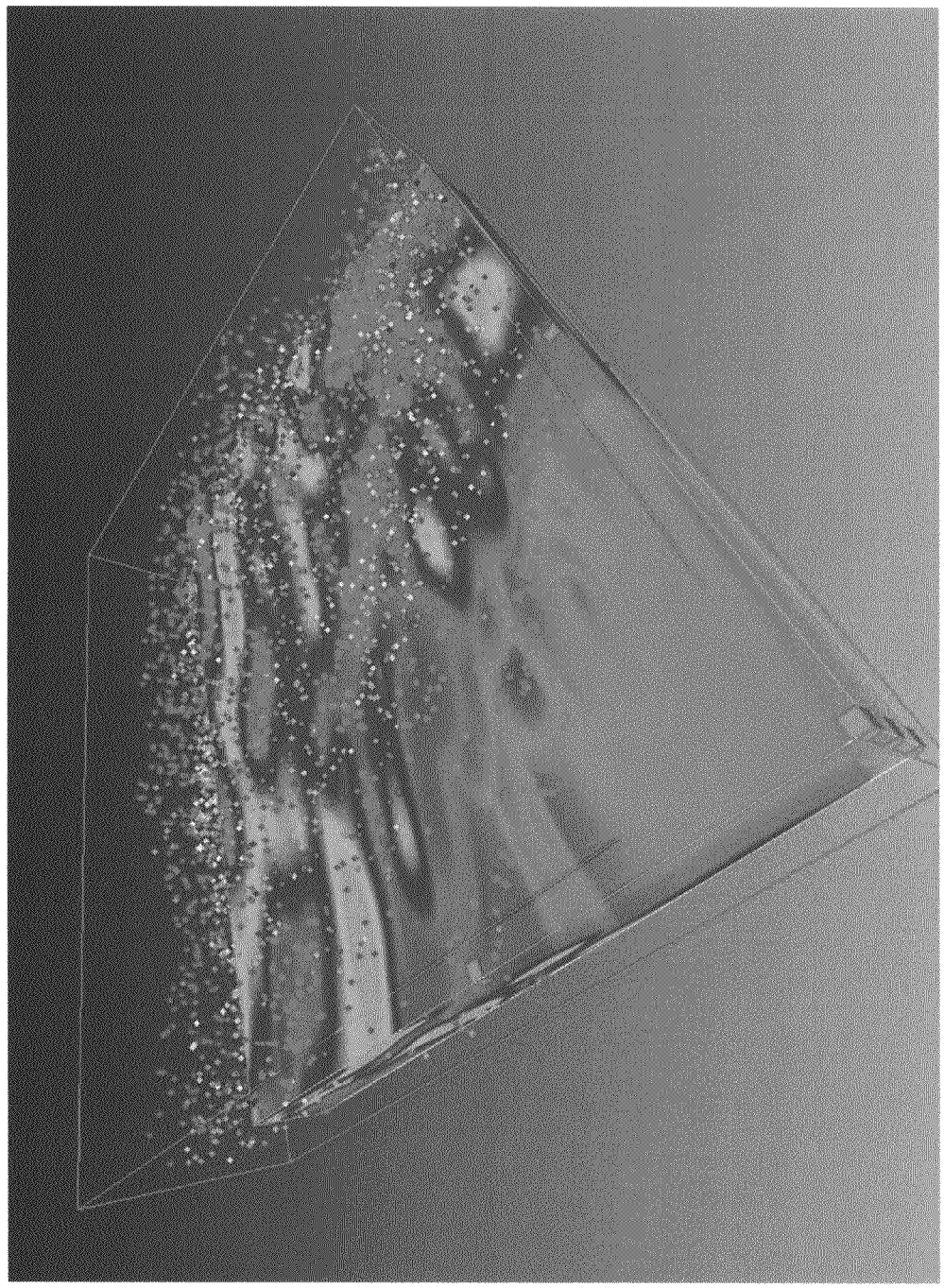
FIG. 11 is a diagram of an example gridless geological model.

Examples of gridless modeling are shown in FIGS. 10-11. The gridless modeling engine 820 propagates properties, performs visualizations, and performs other modeling operations directly on the current structural data 954, that is, the coordinates and physical properties of the structural model currently being investigated, only building a 3-dimensional grid when simulation or other processes require it.

Properties, that is, values for the cells of a hypothetical grid to be modeled without calculating the grid itself (or all the values that would make up the grid), can be considered collections of input data 954 and the functions 952 and settings used to propagate them throughout a modeled earth volume. Values can be calculated at points in the real space of a current structural framework model and need not be tied to the three-dimensional grid during operations, for example, during verification of values and points by the quality check manager 934.

When populating the three-dimensional grid is required for simulation or some other operation, the values are then evaluated in each grid cell of a grid. But at this point, when the need to actually populate the entire grid arrives, the property to be populated has already been quality checked and the user can be certain that the result of propagating the property will be valid. Thus, the populating only has to be done once. A same propagation can be applied to numerous available grids based on a parent structural model.

The virtual nature of a property modeled at a point makes propagation of properties ideal for parallel processing by an auxiliary processor 836, when available, via the computation offloader 942. The settings to distribute properties are storable in a database, and when the 3-dimentional grid is later constructed for a simulation, the grid parameters manager 936 can pass the settings for propagating specific virtual properties to the geological modeler 802 to generate the grid, using an auxiliary processor 836 (e.g., or a graphics card) when available.

In one implementation, the example gridless modeling engine 820 performs some basic steps:

Defines hard data to model from the current structural data 954 and corresponding input parameters;

Defines a stratigraphy 960 to be applied at the domain space converter 958 (i.e., a method of domain conversion from real space to a depositional space);

Evaluates a select property at selected points using the interpolation function 952;

Displays the points via the display engine 918, initially interpolating crudely between them, as shown in FIGS. 10-11, and then refining into a requested view.

In one implementation, input for the gridless modeling process is the current structural data 954 in scattered form, e.g., a series of points with defined coordinates in 3-dimensional rectangular coordinate space, and a property value for each corresponding point.

The current stratigraphy 960 includes a definition of domain space conversion to define how the property values should be interpolated. The domain space converter 958 tends toward propagating values laterally. This is because geological properties are often continuous in a sub-horizontal direction and very variable vertically.

Figure 12:
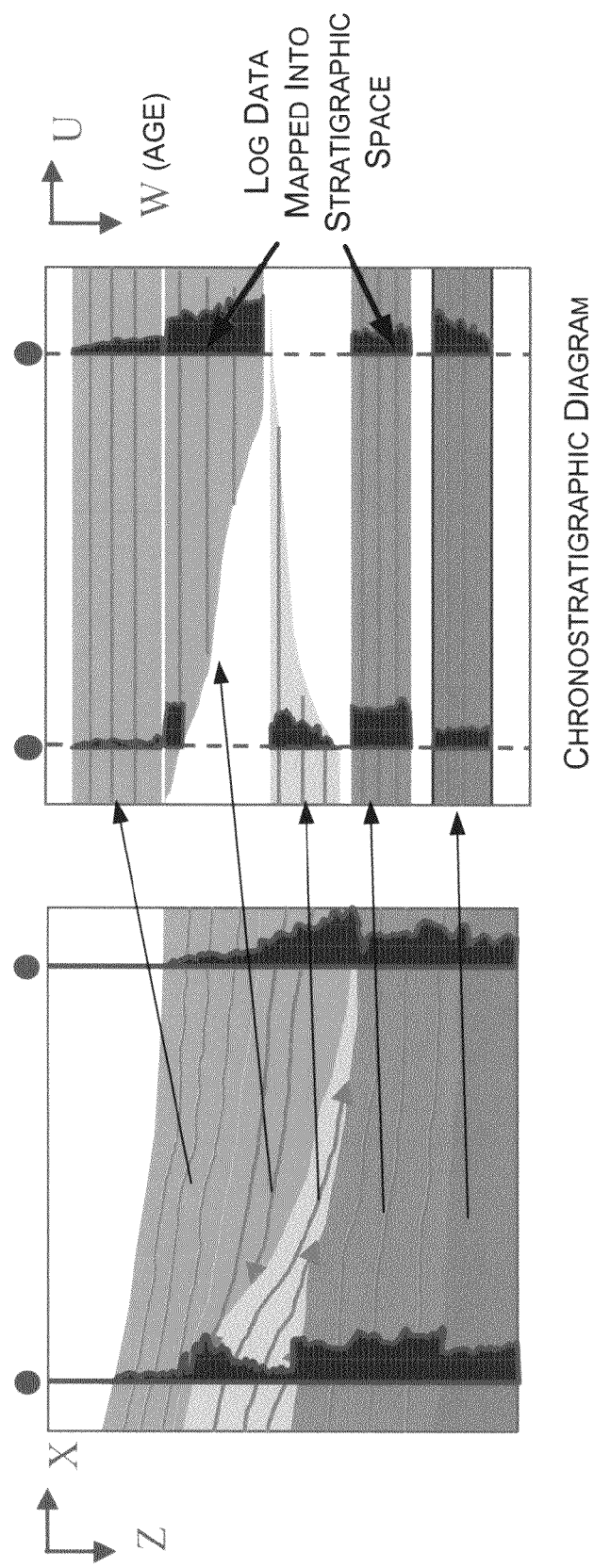
FIG. 12 is a diagram demonstrating conversion of structural geological properties into a chronostratigraphic domain.

Essentially, the domain space conversion can be defined as a transform from XYZ real space to space at the time of geological deposition. In FIG. 12, the right-side image shows such a transformation. Because of the isochronic nature of the transformed layers, the interpolation is usually most consistent in the horizontal direction, which simplifies interpolation. Input data 954 undergo the domain space transformation. The interpolation engine 940 operates in the pseudo-XYZ system of transformed domain space and then returns the results are returned to the real space of the structural model.

The domain space conversion may be simple or complex. The simplest method of creating the stratigraphic transform is to define that XY remains the same and that Z is equal to the distance above or below a surface, or the proportional distance between two surfaces. A complex domain space conversion, on the other hand, goes further and removes faults.

Figure 13:
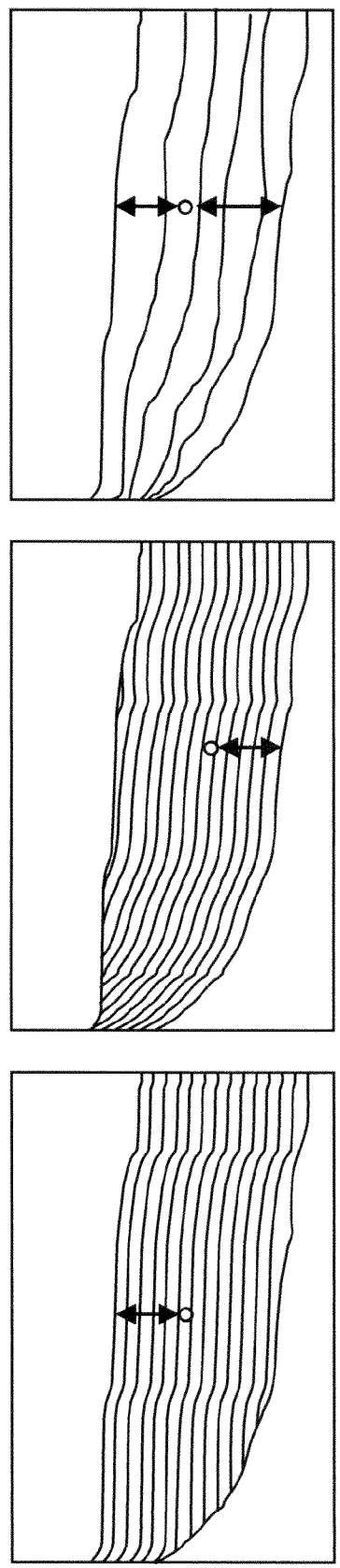
FIG. 13 is a diagram demonstrating a relation of a point to horizons in a simple domain space transform.

The functional transform from XYZ space in the model to IJK equivalent deposition space does not need to be a full paleospastic reconstruction, accounting for volumes or compression, but, as shown in FIG. 13, can just be a transform from the structural model to an unfaulted space with the correct relations between points.

As introduced above, geophysical data 954 are often collected with an irregular spatial distribution. For example, in an airborne geophysical survey, data are collected along approximately parallel transects across the area of interest. The sample spacing, both in-line and cross-line, can vary substantially from the inevitable speed and course fluctuations of flight. Additionally, irregularity is exaggerated by a tendency to collect the data at a higher density along lines than between the lines (by an order of magnitude or more for magnetics).

Consider geophysical data 954 as points $\{x_i \in R^3, i=1, \ldots, N\}$ and a set of scalar values $\{w_i\}$ associated with these points. Each type of scalar value $\{w_i\}$ is a property being modeled.

In one implementation, the function generator 950 has the task of finding a function $f(x)$ that:

1. Interpolates the input data $f(x_i)=w_i$; and
2. Minimizes some physically-relevant functional.

Figure 14:
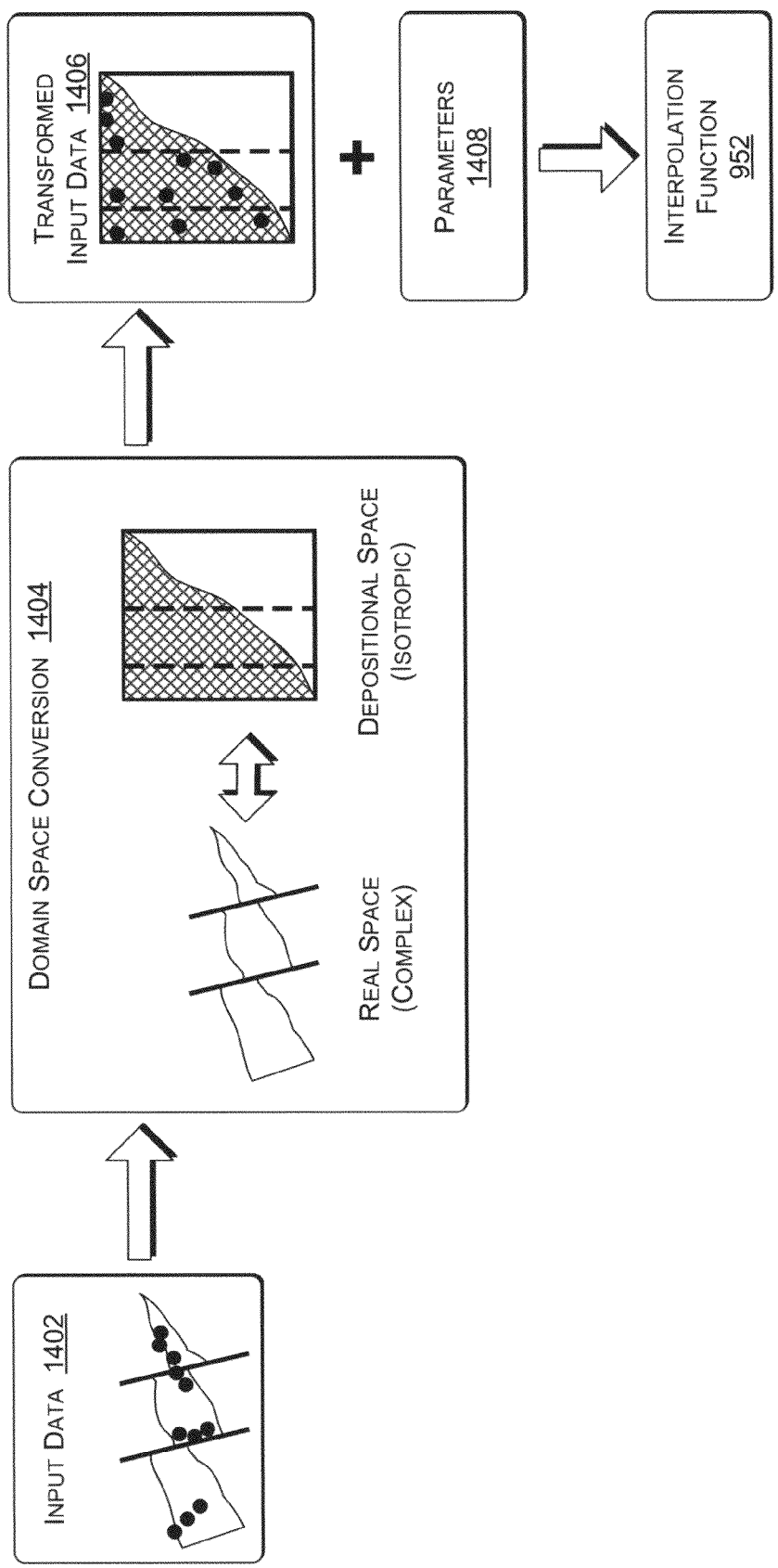
FIG. 14 is a diagram of an example process flow for creating an interpolation function.

FIG. 14 shows a process flow for creating the function $f(x)$ to model a specific property. The input data 1402 from the current structural data 954, as mentioned above, can be a series of points with defined Cartesian coordinates XYZ and a property value P. These are created, for example, based on real well data.

The definition of stratigraphy (domain space conversion 1404) defines how values should be interpolated—laterally in isotropic depositional space. A complex domain space conversion 1404 removes faults, etc.

The function generator 950 takes advantage of the fact that at least at the time of geological deposition, geological properties are usually continuous in a sub horizontal direction, although very variable vertically. So the transform is from XYZ real space to a hypothetical space at the time of deposition.

In FIG. 14, after the transformation, the transformed data 1406 are consistent in the horizontal direction so that lateral interpolation is simple. As introduce above, input data 1402 undergo the domain space conversion 1404 (transformation), then interpolation can be performed in the pseudo-XYZ space and the result returned to the real space. Parameters 1408 depend on the interpolation function being created.

An example function 952 fitting the criteria described above has the following form, shown in Equation (1):

$$f(x) = p(x) + \sum_{i=1}^{N} \lambda_i \Phi(\|x - x_i\|)_r, \quad (1)$$

$$f(x_i) = w_i, i = 1, \ldots, N,$$

$$\sum_{i=1}^{N} \lambda_i q(x_i) = 0, \forall q \in \pi_k^3,$$

where p(x) is a polynomial of low-degree k, $\{\lambda_i\}$ is a set of weights and $\Phi$ is a fixed radial function from $R^+ \to R$.

A radial basis function is a real-valued function whose value depends only on the distance from the origin, so that $$\phi(x) = \phi(\|x\|)$$

or alternatively on the distance from some other point c, called a center, so that $$\phi(x,c) = \phi(\|x-c\|).$$

Any function $\phi$ that satisfies the property $$\phi(x) = \phi(\|x\|)$$

is a radial function. The norm is usually Euclidean distance. Radial basis functions are typically used to build up function approximations of the form $$y(x) = \sum_{i=1}^{N} w_i \phi(\|x - c_i\|),$$

where the approximating function y(x) is represented as a sum of N radial basis functions, each associated with a different center $c_i$, and weighted by an appropriate coefficient $w_i$. Approximation schemes of this kind have been particularly used in time series prediction and control of nonlinear systems exhibiting sufficiently simple chaotic behavior, and 3-dimensional reconstruction in computer graphics.

A special case of radial basis functions uses a bi-harmonic spline in three-dimensions. This spline can be described as in Equation (2):

$$\Phi(r) = r. \quad (2)$$

Equation (1) then has the following form, shown in Equation (3):

$$f(x) = p(x) + \sum_{i=1}^{N} \lambda_i r, \quad (3)$$

$$f(x_i) = w_i, i = 1, \ldots, N,$$

$$\sum_{i=1}^{N} \lambda_i q(x_i) = 0, \forall q \in \pi_k^3.$$

A resulting "smoothest" interpolator in 3-dimensional space can then be obtained that minimizes a "thin-plate" energy functional involving $2^{nd}$ order derivatives:

$$\|f\|^2 = \int_{R^3} \left[ \left(\frac{\partial^2 f}{\partial x^2}\right)^2 + \left(\frac{\partial^2 f}{\partial y^2}\right)^2 + \left(\frac{\partial^2 f}{\partial z^2}\right)^2 + 2\left(\frac{\partial^2 f}{\partial x \partial y}\right)^2 + 2\left(\frac{\partial^2 f}{\partial x \partial z}\right)^2 + 2\left(\frac{\partial^2 f}{\partial y \partial z}\right)^2 \right] dx\,dy\,dz.$$

Choosing this basis function to emphasize smoothness gives rise to some useful and well-performing families of spline interpolants. The method is effective and stable which leads to strictly positive definite symmetric matrix (Cholesky decomposition).

Radial Basis Function (RBF) approaches for smoothing noisy data include:

1. Before creating an interpolant, modifying the smoothness criteria:

$$\left(\rho \|f\|^2 + \frac{1}{N} \sum_{i=1}^{N} (f(x_i) - w_i)^2\right), \rho > 0$$

In this case, the smoothing engine 956 re-solves the problem every time the smoothing parameter $\rho$ is changed.

2. After creating an interpolant, averaging the resulting function. The smoothing parameter defines the radius of smoothing, and there is no need to re-solve the problem.

In one implementation, the only parameter used in the workflow is a "feature size," which is a descriptive geometric parameter. All features that are smaller than the given size are smoothed away (caution required in the case of several disjoint components and topology changes).

With no additional input to the contrary, the interpolation function 952 described above tends to interpolate horizontally. Geological features often follow the line or "grain" of the geology. If the Z attribute of the data passed to and from the interpolation engine 940 comprises distance beneath a given surface, or relative position between two surfaces, then the result of the interpolation function 952 can be made to follow a geological structure.

The accelerated rendering engine 932 aims to populate the gridless geological model rapidly, so that the model can be interactive with the user in real-time (i.e., responsive to input from the user in real-time or near real-time). One aspect of acceleration over the relatively slow speed of conventional grid generators is calculating values only for points chosen by the point selector 944.

In one implementation, the gridless modeling engine 820 implements another aspect of acceleration by employing one or more available auxiliary processors 836, for example, a graphics processor with idle bandwidth. "General-purpose-computing-on-graphics-processing-units (processes known as GPGPU, GPGP, and also $GP^2$) are techniques for utilizing a GPU, which typically handles only graphics computations, to perform computations usually handled by the central processing unit (CPU) 808 of a computing device 800. GPUs are designed specifically for graphics and are conventionally exclusive with regard to non-graphics operations and programming. Because of this restricted role, GPUs are usually only effective for computation using stream processing and the hardware can only be used in certain ways. For the innovative gridless geological modeling, such an auxiliary utilization of a spare processor can be realized by adding programmable stages and precision arithmetic to rendering pipelines. This enables the gridless modeling engine 820 to apply stream processing to non-graphics data.

Figure 15:
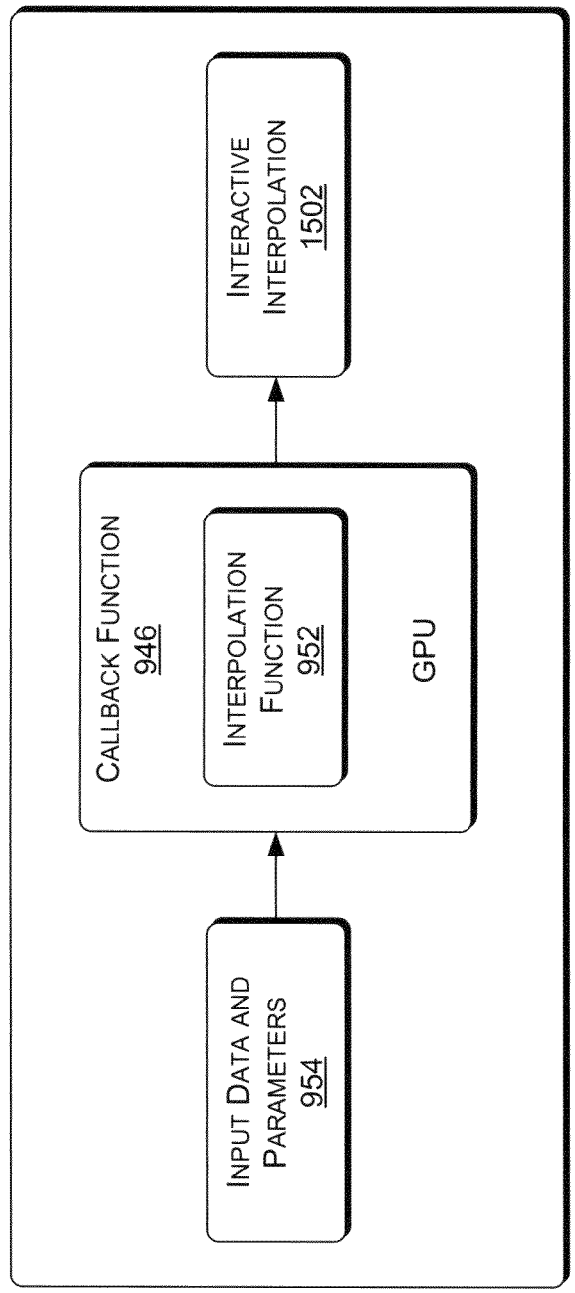
FIG. 15 is a diagram of an example process flow for applying the interpolation function with a callback function.

The interpolation function 952 may be associated with or implemented in a callback engine 946 to realize the acceleration. FIG. 15 shows one implementation of a process flow for applying the interpolation function 952 to input data 954 at a Graphics Processing Unit (GPU) using the callback function 946. Processing the interpolation operation at an auxiliary processor 836, such as a GPU, also provides acceleration toward the task of enabling interactive interpolation 1502. A callback comprises executable code that is passed as an argument to other code. Callbacks enable lower-level software layers to call a subroutine (or function) defined in higher-level layers. Typically, higher-level code starts a callback process by calling a function within the lower-level code, and passing to it a pointer or handle to another function. While the lower-level function executes, it may call the passed-in function any number of times to perform some subtask. In another scenario, the lower-level function registers the passed-in function as a handler that is to be called asynchronously by the lower-level at a later time in reaction to an event or request.

Gridless modeling of available points can be performed, creating virtual properties. The quality check manager 934 performs on those values visible at a given time, and these can be calculated on the fly depending on the setting of the view mode selector 910 (2-D or 3-D), camera positions (near-far and angle of view), current stratigraphy 960, and available computer resources. In most gridless modeling scenarios, thousands of points are calculated rather than millions, so the gain in speed can be used to make the process interactive. The thousands of points can be modeled interactively on intersections, planes, surfaces, cross plots, etc., within the modeled volume, rather than modeling every point in the modeled volume at once.

In one implementation, an intersection of visual planes can be displayed showing a visualized property in the displayed planes. To do this, the property is quickly calculated at points on the intersected visual planes at a coarse resolution. Based on the angle of view, the resolution & perspective engine 948 can perform a further refining of the resolution by evaluating more values visually closer to the camera and fewer values visually distant from the camera. The interpolation engine 940 may then propagate property values over the visible surface of the displayed planes, yielding a color-coded map of the property values at each location in the sliced earth volume.

Interactive gridless models are scalable. Large models can be created on a computer with relatively limited resources, and even larger comprehensive models can be created on powerful computers that are now readily available.

Example Interactive Graphical User Interfaces (GUIs)

Graphical User Interfaces (GUIs) provide a gateway between users and many types of application programs for visualizing and manipulating application-specific objects or information.

Figure 16:
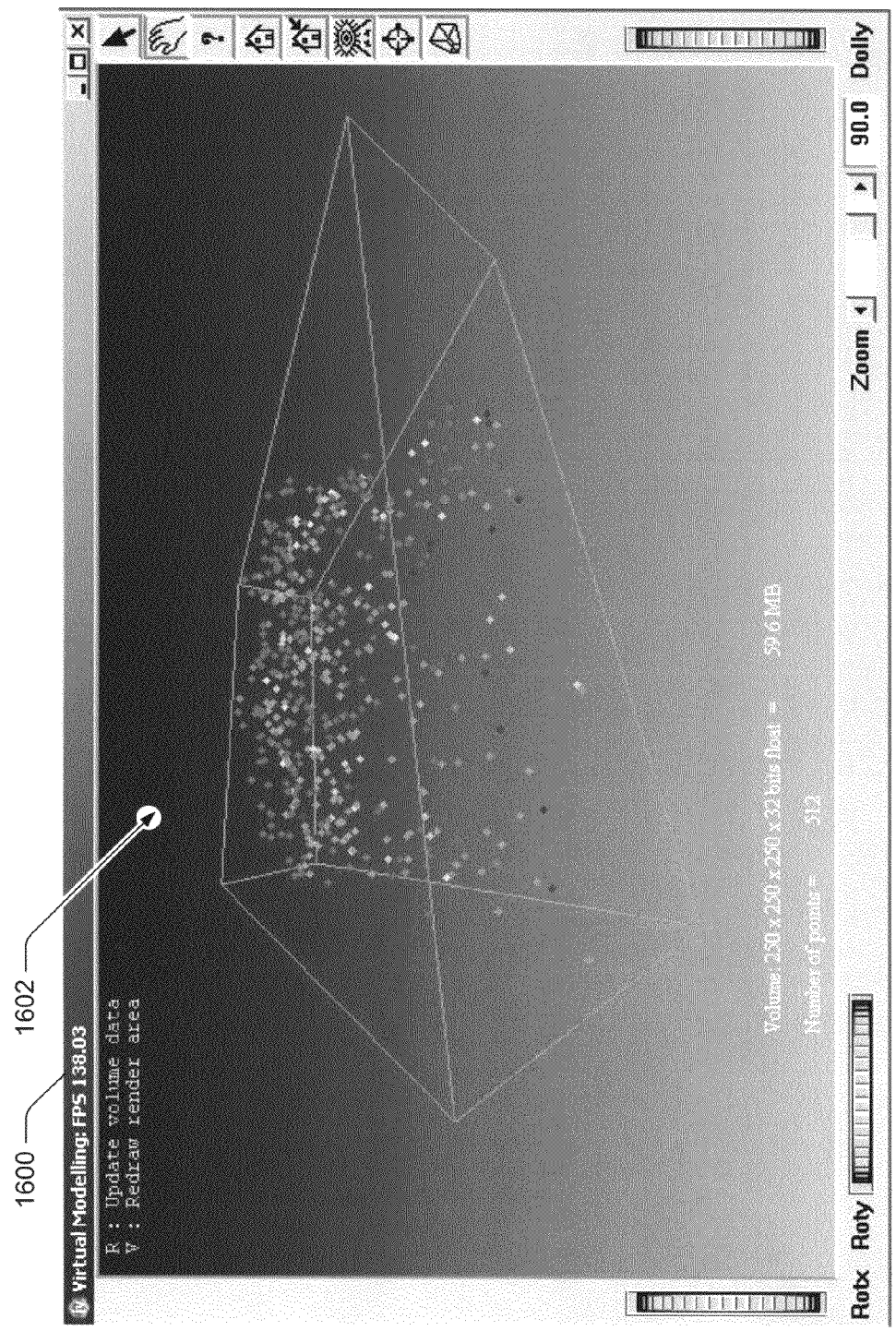
FIG. 16 is a screenshot of an example Graphical User Interface for displaying interactive gridless geological modeling.

In one implementation the rendered volume is displayed in gridless 3-dimensional space in the main window 1600 shown in FIG. 16. At the bottom of the window 1600, information about the current volume may be displayed. In one implementation, for example, the first three values may be the height, width, and depth of the modeled volume in voxels. A fourth value may be the size of the voxel unit in use (8 bits or 16 bits). A final displayed value may be the total size of the modeled volume in memory (e.g., in megabytes).

In one implementation, such a visual model as shown in main window 1600 is created with the standard OPEN INVENTOR EXAMINERVIEWER class. This class implements a "virtual trackball" which allows the user to implement a mouse to rotate, spin, pan and magnify the rendered volume (and other geometry in the modeled scene). Icons may surround the actual viewing pane 1602 drawing window and provide controls such as thumbwheels for rotating the scene and buttons for various functions. An arrow button may be provided for selection mode. In this mode the cursor shape is a default pointing cursor and the mouse can be used to "grab" and drag 3-dimensional user interface objects called "manipulators." A hand button may be provided for viewing mode. In this mode, the mouse can be used to rotate, pan, and zoom the scene. The <ESC> key can also be used to switch between selection and viewing modes. The EXAMINERVIEWER class also provides a standard popup menu activated by the right mouse button.

In one implementation, the initially input data and an empty seismic cube (but fitting the data) are displayed in the main window 1600. The input data are a series of points with XYZ coordinates and a property value. These are created from real well attributes. In one implementation, the input data are shown as scaled diamonds in different colors. The color distribution depends on the minimum and maximum property value thresholds.

An issue arising in the art of geological modeling is that a limiting threshold arrives very quickly when modeling at which interpretation and exploration of models becomes difficult for the human eye, and at which current computer resources have difficulty coping with the voluminous amount of data.

The gridless modeling techniques, therefore, enable new user interfaces for viewing aspects of the modeled data. For example, key features of new gridless model user interfaces 826 for presentation of geological structural models and three-dimensional grids include:
  interactive volume probes
  interactive dimensional slice operations
  interactive color map filters
  interactive histograms
which may be combined as suitable in various implementations of a gridless modeling system.

Figure 17:
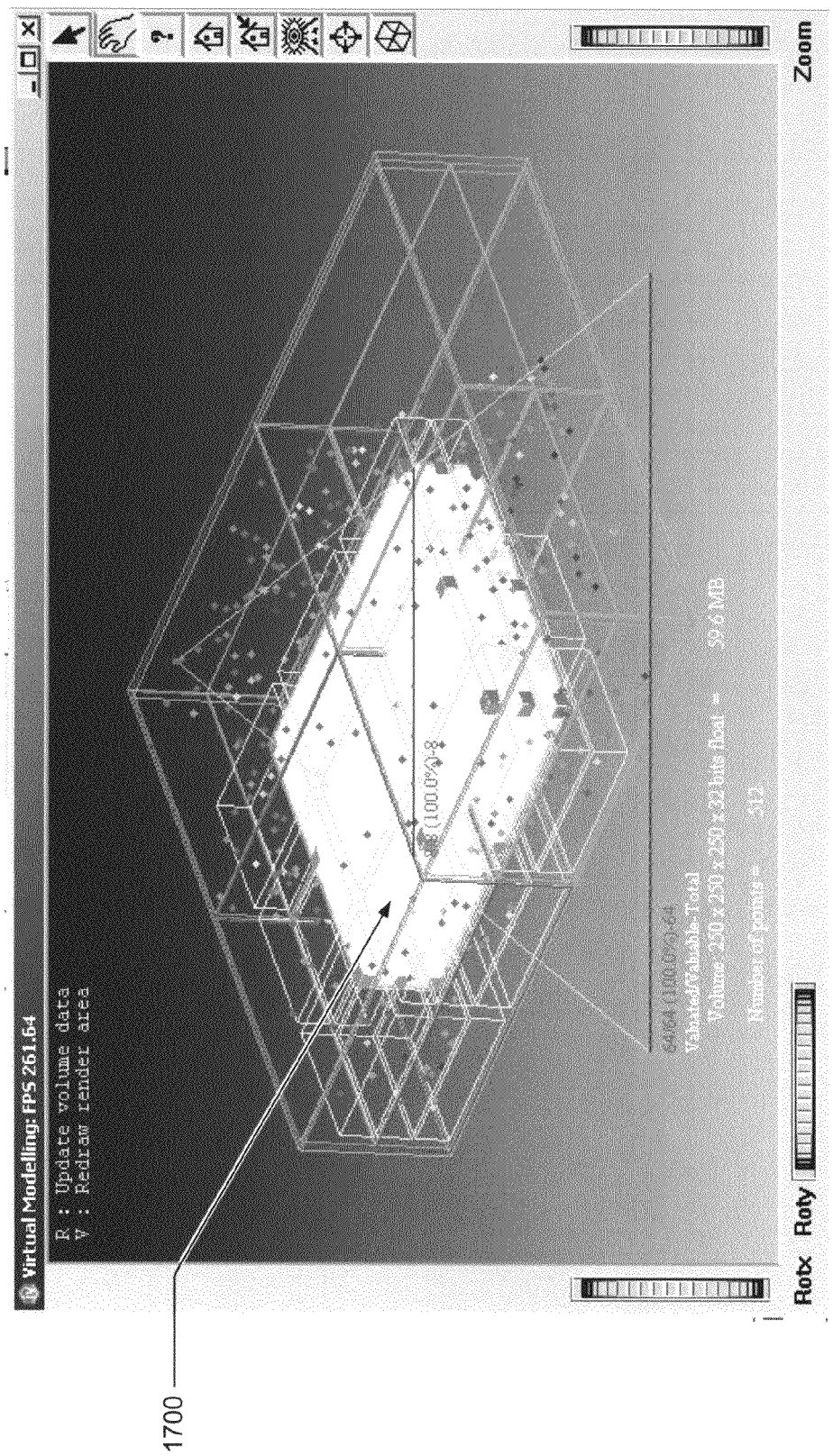
FIG. 17 is a diagram of an example Graphical User Interface showing a volume probe inserted into a visualization of an interactive gridless geological model.
Figure 18:
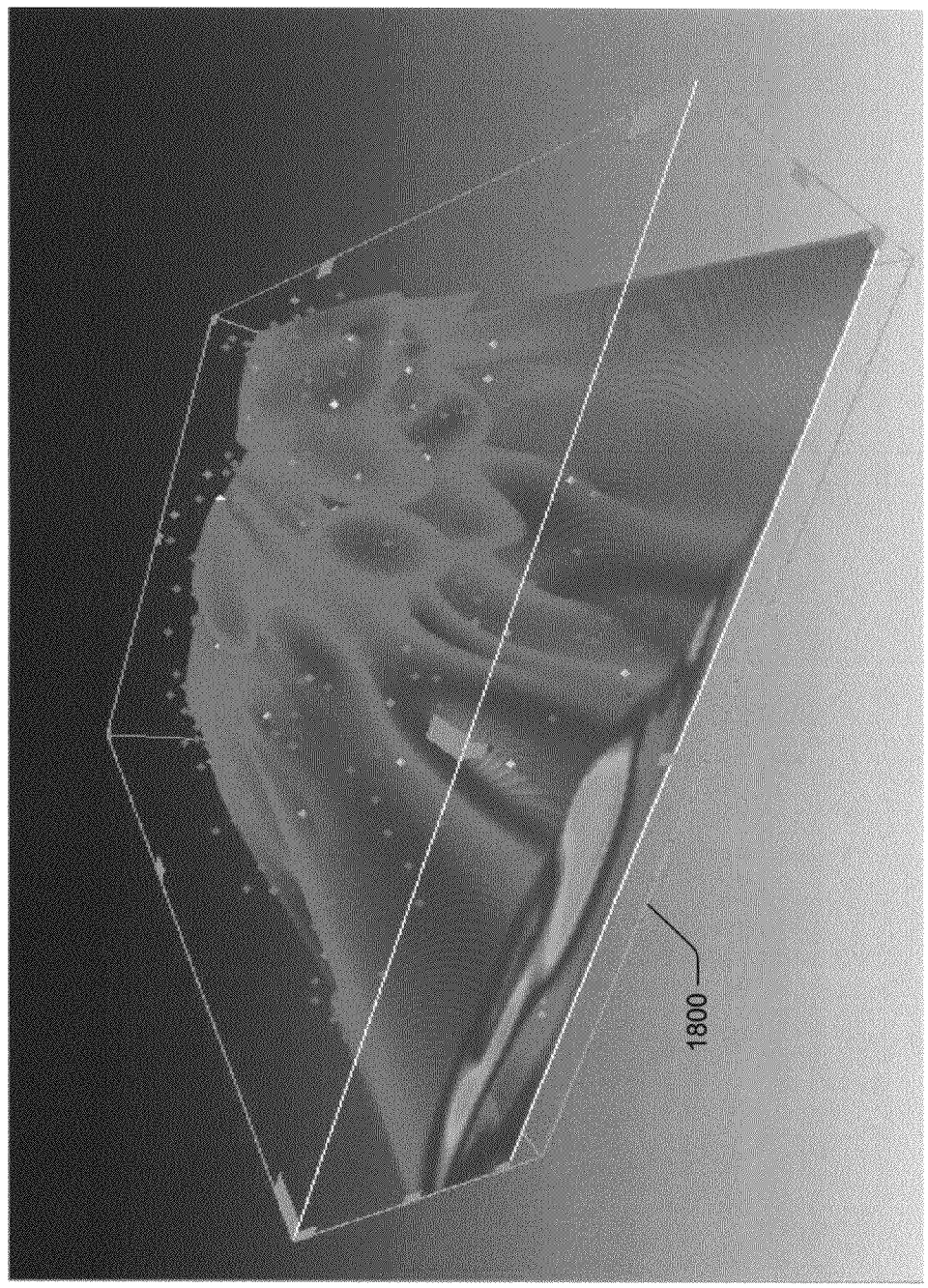
FIG. 18 is a diagram of an example Graphical User Interface showing localized calculations within a volume probe.

FIG. 17 shows an interactive volume probe 1700 in the context of an entire gridless geological model, including an "outlines" feature. FIG. 18 shows a "close-up" view of an interactive volume probe 1800, including localized calculations within the volume probe 1800. A volume probe (e.g., 1700, 1800) can be inserted into an overall gridless geological model to view a region of interest in the working model, and modifies the visible portion of the data volume. It is worth noting again that the illustration is a black and white rendering of a color-coded model.

By default the interactive volume probe 1700 specifies a simple subvolume. However the volume probe 1700 can specify more complex shapes. This is particularly useful when working with a large volume, providing a base for localized calculations and ultra fast interactive rendering. The volume probe 1700 can be resized and scaled to cover different ranges of the given data volume, starting from a minimal cell presentation to the full-sized volume of the three-dimensional grid. The volume probe 1700 can be easily and interactively moved through the whole modeling volume.

By user-selection via the inclusion/exclusion selector 924, the interactive volume probe 1700 can be either an inclusion box (subvolume), which specifies the region of the volume that should be visually rendered, or an exclusion box, which specifies a region of the volume that will not be rendered. This provides a valuable tool for cutting away part of the entire volume or part of the current subvolume.

In one implementation, the resolution selector 912 sets the resolution in the region of interest to the highest degree that still allows an interactive speed for the volume probe 1800 within the given modeling volume.

Figure 19:
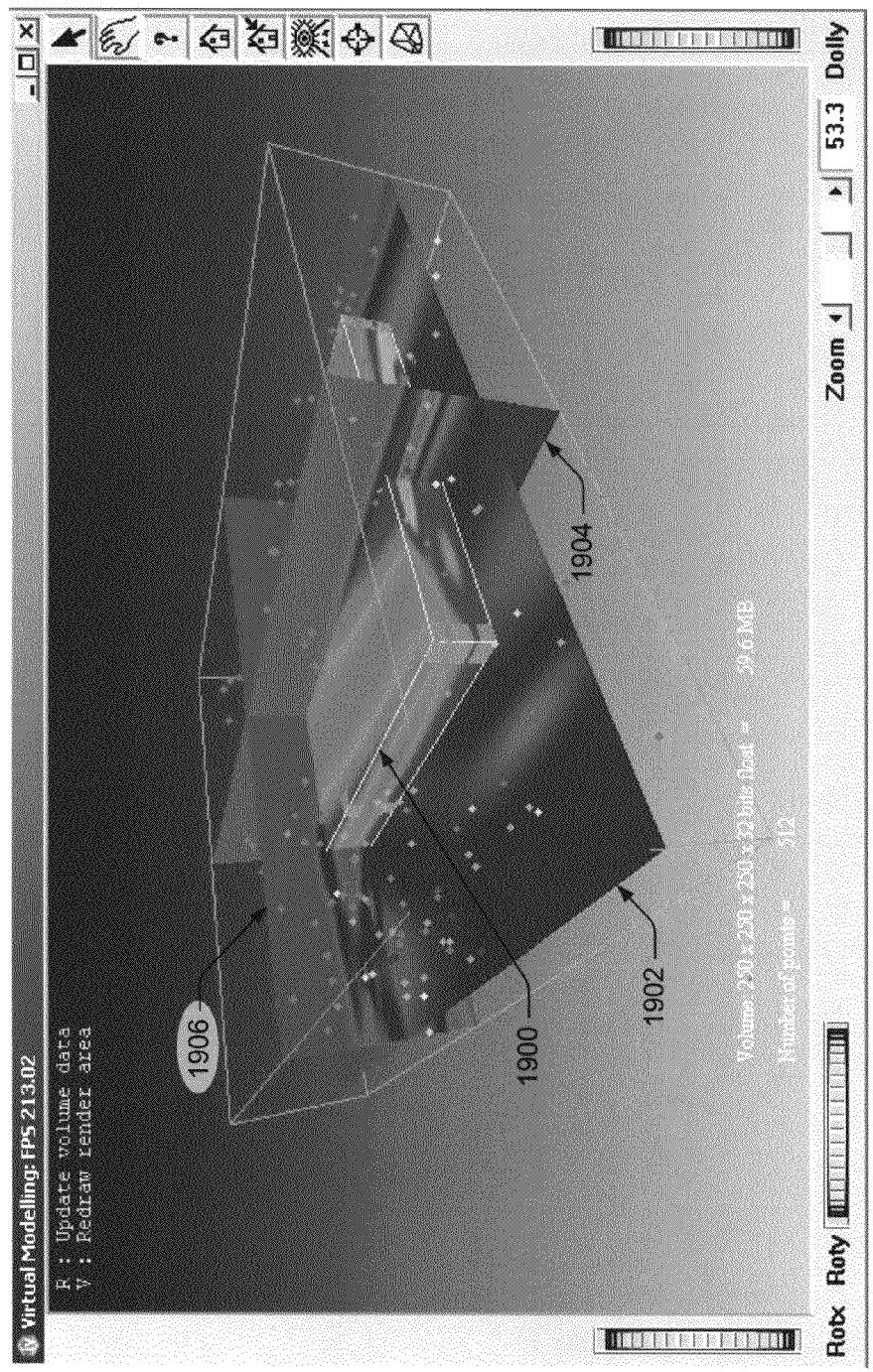
FIG. 19 is a screenshot of an example Graphical User Interface showing a volume probe and dimensional slices or intersection planes in an interactive gridless geological model.
Figure 20:
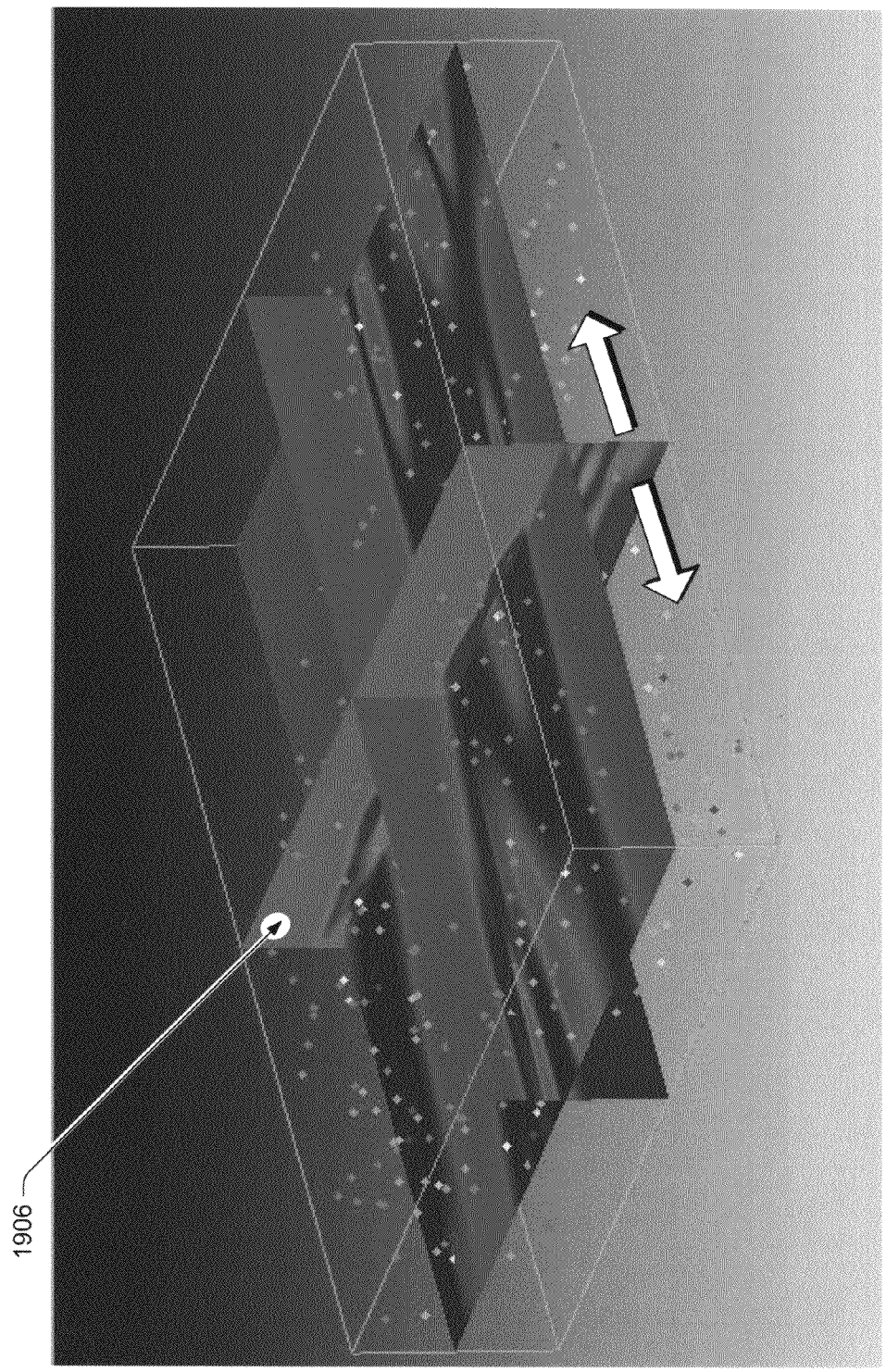
FIG. 20 is a diagram of an example Graphical User Interface displaying a gridless geological model that has aligned intersection planes in three rectangular dimensions including localized calculations on the intersection planes

As shown in FIG. 19, presenting a volume probe 1900 into a gridless geological model also makes it efficient for the dimensional slice engine 926 to add intersection planes 1902, 1904, 1906 in the three available directions of a specified rectangular coordinate system. FIG. 20 shows localized calculations on intersection planes in 3-dimensions. The property browsing controller 920 can move the intersection planes (e.g., 1906) separately from each other and interactively in the corresponding navigation directions across the interior of the gridless model. The resolution & perspective engine 948 sets the resolution on a displayed slice to a high degree within the given modeling volume, yet a resolution that still allows interactive speed for the displayed slice or intersection.

FIG. 21 shows various combinations of dimensional slices, or intersection planes, including XY planes 2102, a lone Z plane 2104, and XYZ planes 2106. The resolution & perspective engine 948 can set the resolution on a dimensional slice to the highest setting within the given modeling volume or slice that still allows the speed of the gridless modeling to be interactive. In one implementation, the gridless modeling engine 820 selects a limited number of anchor points on the surface of a slice or intersection to be rendered, and then the interpolation engine 940 calculates or approximates all the points on the plane as if constructing a grid, but only on the plane(s) being rendered. This can be done with such speed that the gridless model remains interactive. More points are rendered for parts of the dimensional slice that appear close to the viewer, and fewer points are rendered for parts that appear further away.

Figure 22:
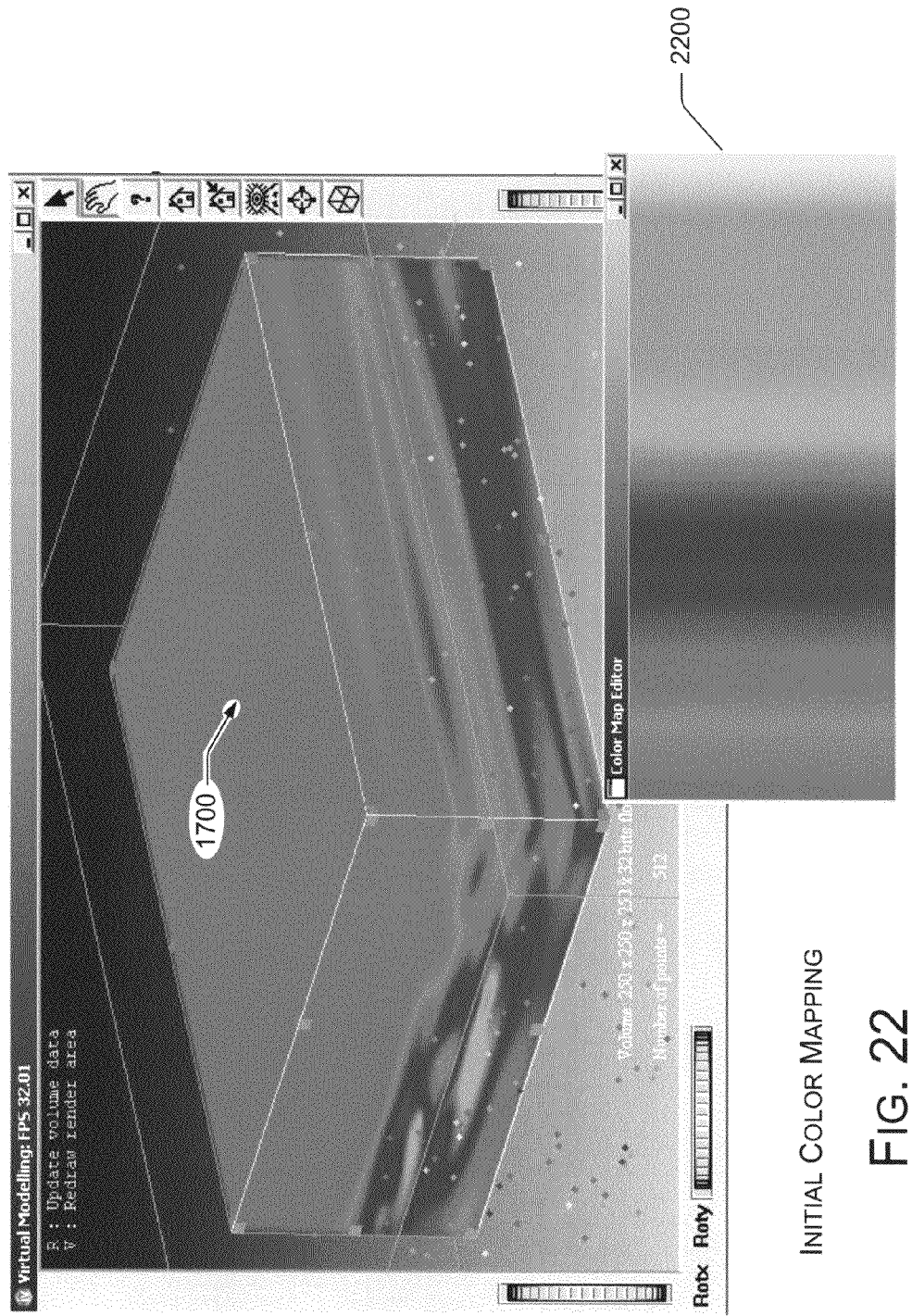
FIG. 22 is a diagram and screenshot of an example interactive color map rendered in black and white, for viewing and filtering a gridless geological model.
Figure 23:
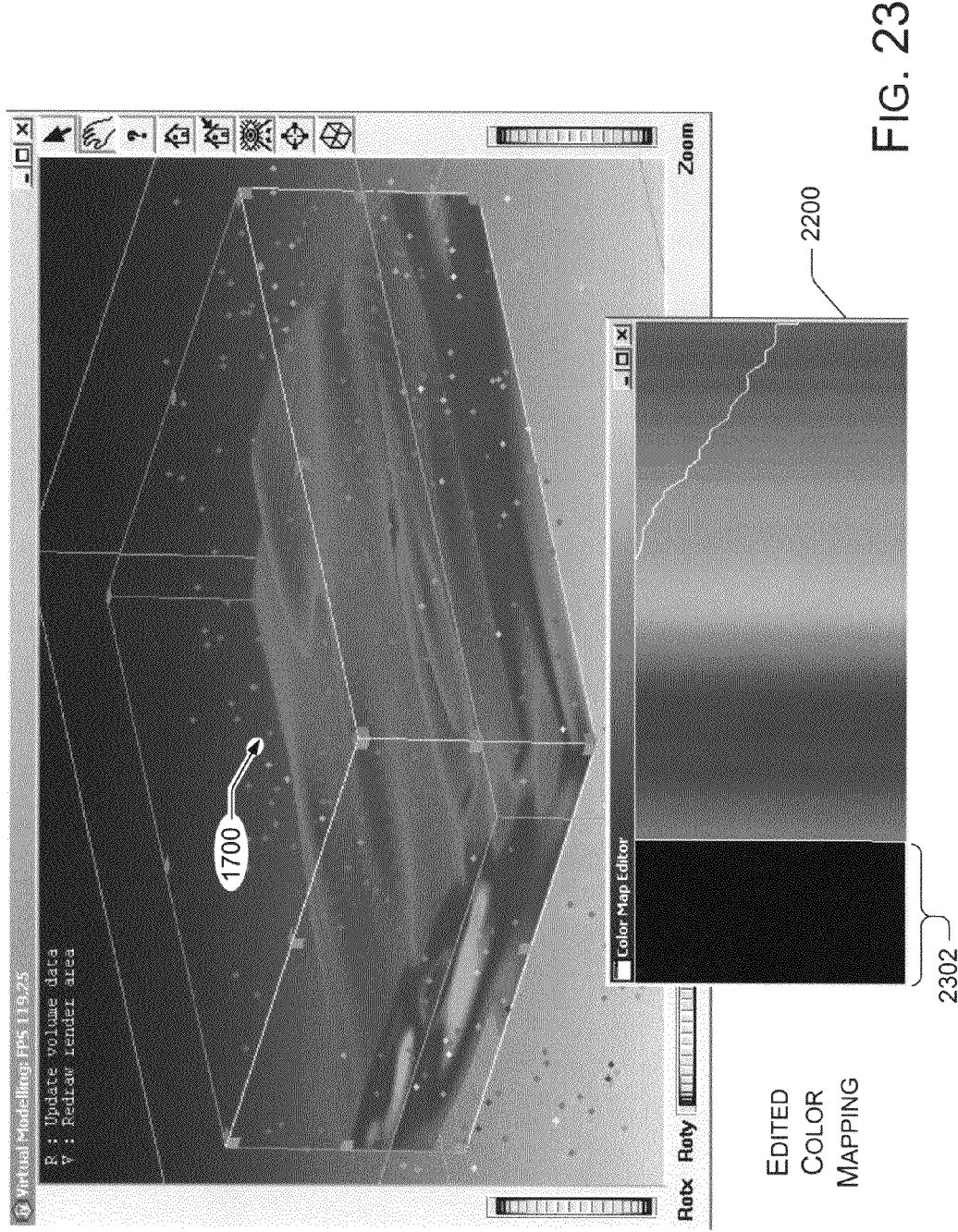
FIG. 23 is a diagram and screenshot of the example interactive color map of FIG. 22, with property values visually filtered out by adjusting the interactive color map.

As shown in FIGS. 22-23, a predefined color map 2200 can be associated with each volume probe 1700, intersection plane 1902, or other modeling object. The color map editor 928 enables the color map 2200 and the predefined values for data minimum and maximum thresholds to be changed by editing the color map 2200 interactively.

The colors on the map 2200 are analogously correlated (color-coded) with the data values displayed. So the color map editor 928 provides a type of interactive viewing filter. FIG. 22 depicts an initial color mapping, while FIG. 23 depicts the same gridless model with an edited color map 2200 that in turn adjusts or filters the color-coded data to be displayed. For example, when the user eliminates some color from the map (e.g., the color "red" is eliminated in FIG. 23 as represented by the illustrated blank region 2302) the color map editor 928 removes all of the data values falling in the corresponding color-coded value range that is coded to "red" from the current display.

Accelerating Interactive User Interfaces

When the user displays an intersection or a volume probe for a given property, the interpolation function 952 can be evaluated at a manageable number of points on that intersection so that the speed of the modelling remains interactive. That is, the points can be few enough that the intersection can be moved interactively.

The accelerated rendering engine 932 can accelerate various visual tools for interactively browsing the gridless model. The browsing controller 920 includes, for example, an interactive volume probe engine 922, an interactive dimensional slice engine 926, an interactive color map editor 928, and an interactive histogram engine 930. Many other interactive visual probes and tools are possible in gridless geological modeling. A volume probe 1700 or a visual intersection plane 1906 can be manipulated on the fly. The localizer 938 minimizes the number of calculations instead of performing global recalculation of an entire 3-dimensional grid with each major or minor modification in the model. Besides not calculating the entire global grid, the localizer 938 also aims to further increase efficiency by reducing the number of points that need to be calculated to visualize even a localized and gridless probe or slice.

The point selector 944 isolates which pseudo-cells to model for interactive display purposes and the interpolation engine 940 returns the grid values for the display engine 918 to present on a display 830.

In one implementation, the virtual property value modeler 904:
  Defines input data 954 and parameters for the calculations;
  Chooses points 944 to be evaluated for optimizing the fastest and the most visually advantageous display presentation;
  Evaluates the property at the points using the fast interpolation function 952 in association with the callback engine 946;
  Interpolates roughly between points for speed, and sends results for rendering by display engine 918;
  Offloads calculations 942 to the graphics processor for fast calculation, when possible, or offloads to another auxiliary processor 836.

When a set of visual intersection planes 1902, 1904, 1906 as shown in FIGS. 19-21, or one or more volume probes 1700, 1800 as shown in FIGS. 17-19 are displayed for the 3-dimensional gridless model, the interpolation function 952 created should be evaluated at a manageable number of points on that intersection or volume probe. The points should be sparse enough that the intersections can be moved interactively.

The points at which the interpolation is calculated are picked by the point selector 944 using the intersection(s) visualized by the display engine 918 and the apparent distance from the camera, so that the resolution & perspective engine 948 provides high resolution when an object or part of an object appears close, and provides lower resolution when the object or part of the object appears further away.

In one implementation, the callback engine 946 runs a routine that chooses the points to evaluate, fitting data for the best display, and sends the points to the interpolation engine 940 to be processed.

In one implementation, VOLUMEVIZ can be used to achieve the interactive rendering (Visualization Sciences Group, Inc., Burlington, Mass.). VOLUMEVIZ is an OPEN INVENTOR module for visualization of volume data. In one implementation, volume data is a 3-dimensional set of uniformly spaced values called voxels. Typically this data represents intensity data derived from oil exploration (seismic).

Example Interactive User Interface Dialogs

As shown in the next four Figures, in one implementation, the gridless model user interface 826 can include four different dialog boxes, providing spread functionality for the currently visualized data set.

Figure 24:
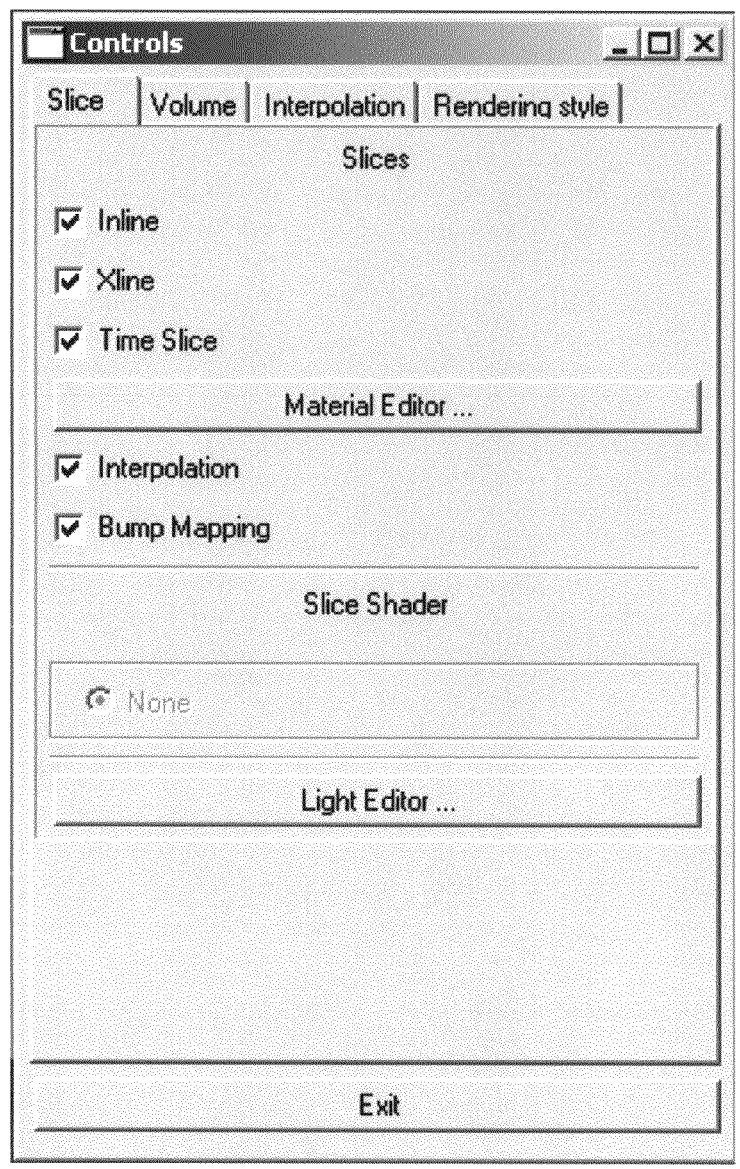
FIG. 24 is a screenshot of an example slice control dialog.

FIG. 24 shows a "SLICE" dialog box that provides user-controls for the dimensional slice engine 926, through which the user can interactively add inlines, crosslines, or time slices. These can be browsed interactively through the gridless model. An inline slice has the plane aligned in a north-to-south (X-axis) direction. In one implementation, this plane cannot be rotated, only moved back and forth along the specified alignment. Seismic intersections are usually along inlines. A crossline slice has the plane aligned in an east-to-west (Y-axis) direction. Seismic intersections can also be aligned along crosslines. A time slice has the plane aligned horizontally (the Z-axis). The plane can be moved up and down along the Z-axis. This is useful when visualizing a time slice cube.

In one implementation, an interpolation check box toggles between "Linear" (linear interpolation) and "Nearest" (nearest neighbor) texture mapping modes. A bump mapping check box enables bump mapping on slices. A normal is computed for each voxel based on the 2-dimensional gradient of the voxel in X and Y and the data value in Z. The user can view the interaction of light with the slice, texture, or bump mapping using the directional light editor. A bump scale checkbox may be provided to control the magnitude of the bumps, when there is programmable shader support.

In one implementation, a material editor button may be provided to bring up a standard material editor to control diffuse, specular, etc., properties of the volume. In the case of texture map rendering, the material editor specifically controls properties of the polygons that are textured. A light editor button may be provided to bring up a standard directional light editor. For example, a gray sphere may be provided to show how light appears when shining on the volume. An indicator, such as a yellow arrow may show the current direction of the light. The user can "grab" this indicator with a mouse and drag the indicator to change the light direction. When the user is finished with the editor, a button is provided to close the dialog box.

Figure 25:
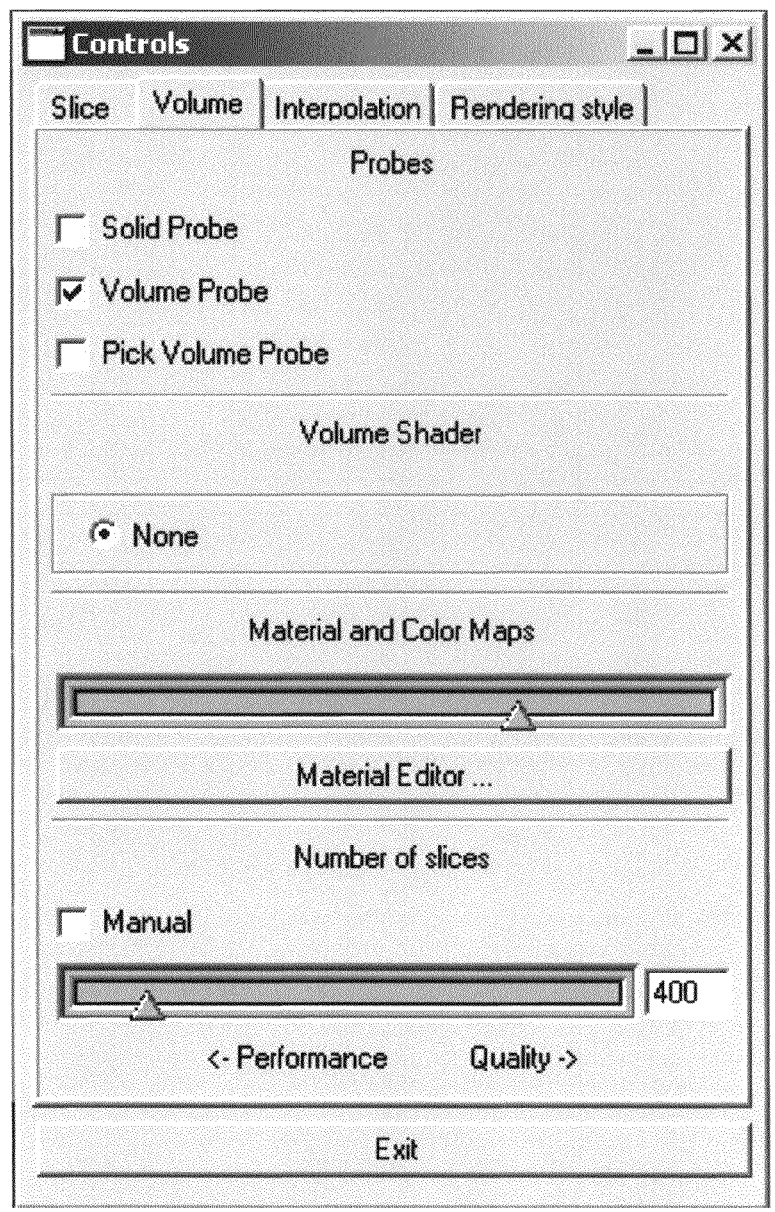
FIG. 25 is a screenshot of an example volume probe control dialog.

FIG. 25 shows a "VOLUME" dialog box that provides user-controls for the volume probe engine 922. In addition to slices (FIG. 24), the volume dialog box enables the user to insert a seismic probe to view a part of the gridless model. In one implementation that uses VOLUMEVIZ, the system supports selection of a region of interest ("ROI"), which modifies the visible portion of the data volume. By default a ROI selection specifies a simple subvolume. However it can specify more complex shapes. In picking a volume probe, the ROI can be specified by two main fields called "subVolume" and "box." These two fields are simple boxes of independent dimensions and locations. The user can define how these two boxes interact with each other to define which part of the volume is visible. This can be useful when working with a large volume or large slices.

By default the inclusion/exclusion selector 924 specifies that the ROI is an "inclusion" box (subvolume) which specifies the region of the volume that can be rendered. The inclusion/exclusion selector 924 can also specify that the region of interest be an "exclusion" box which specifies a region of the volume that will not be rendered. This can be useful for cutting away part of the volume or the current subvolume.

To define a region of interest, the user first confirms that the main window 1600 has the focus (is the active pane—by clicking in it if necessary). Then the user verifies that the viewer is in selection mode (e.g., cursor is an arrow shape). In one implementation, the region of interest cannot be larger than the data volume and cannot move outside the data volume.

A "number of slices" slider may be provided to control the number of slices drawn for 3-dimensional and 2-dimensional multi-texture map rendering. A zero setting sets selection of the number of slices to automatic. Rendering fewer slices generally improves performance (with reduced image quality). A modeling application can reduce the number of slices drawn during interactive operations to improve speed and performance.

A "slice number" or "current slice" slider may show a number where the slice is currently positioned. It can also be used to drag the slice through the data volume. In one implementation, when a check box to the side of the slider is "checked," the slice is moved dynamically as the slider moves. Otherwise the slice is only moved when the user releases a mouse button after moving the slider. The user may also type a slice number in the edit box.

Material and color map options may be provided. In addition to the color map that the slice is using, a material can also be used to modify transparency and lighting. Actuating a "material editor" button can bring up a dialog which enables the user to modify the material parameters.

A picking probe check box may be provided to toggle a volume/slice picking mode and to make visible a pick profile window.

Figure 26:
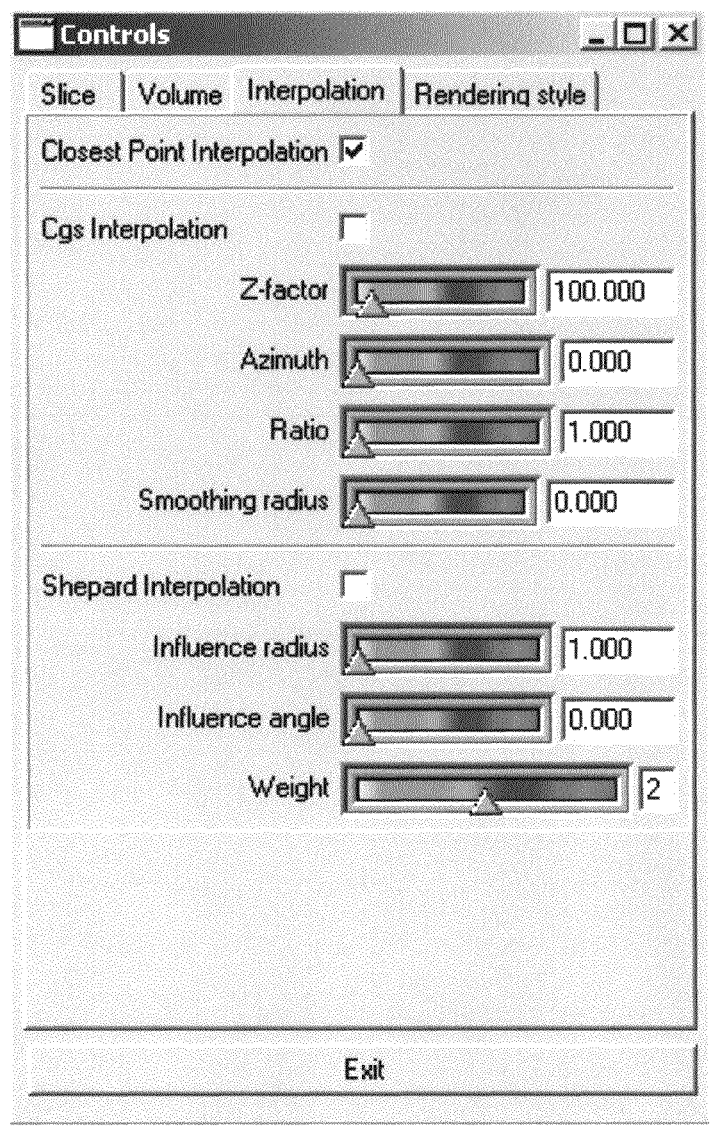
FIG. 26 is a screenshot of an example interpolation control dialog.

FIG. 26 shows an "INTERPOLATION" dialog box that provides user-controls for the interpolation engine 940. Several interpolation functions can be selected. In one implementation, a CGS interpolation function 952 performs better than a Shepard interpolation function 952 and closest point interpolation function 952.

The CGS interpolation function 952 has selectable parameters, such as a smoothing radius, Z-attribute, and an aspect ratio (azimuth) so that the data can be extrapolated preferentially in XYZ directions.

Figure 27:
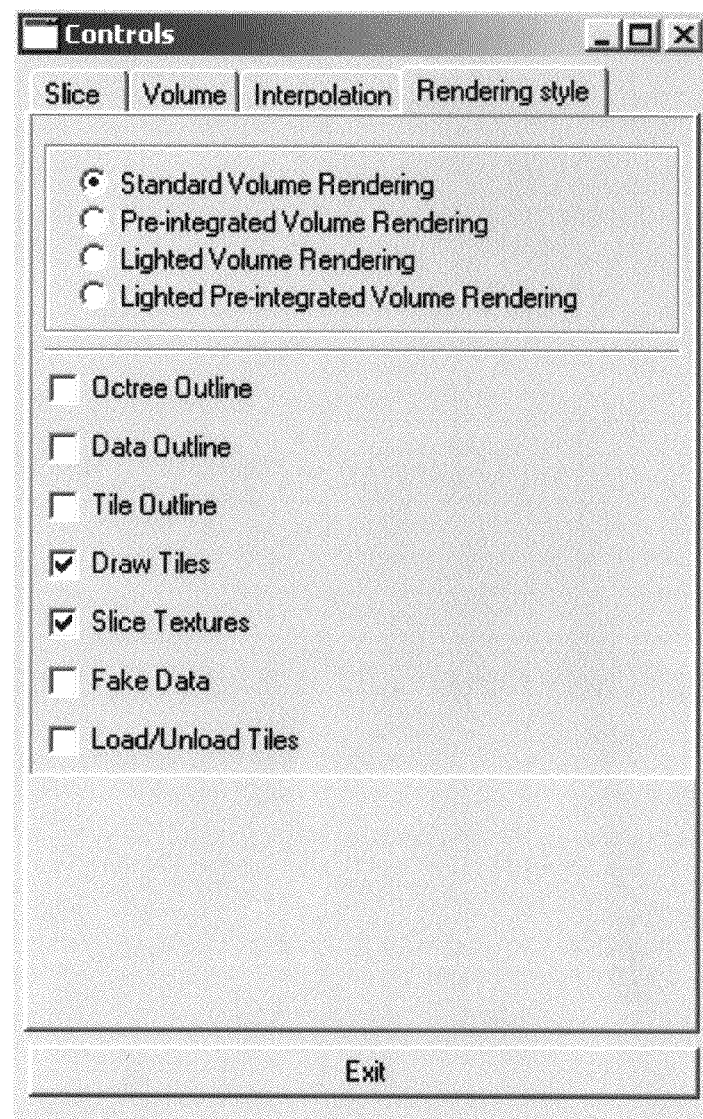
FIG. 27 is a screenshot of an example rendering style control dialog.

FIG. 27 shows a "RENDERING STYLE" dialog box that provides user-controls for a rendering style feature of the display engine 918. The following features listed below can be implemented for a better visualization of the multi-resolution topology.

Octree Outline: for a default implementation, this setting can display an octree representation showing traversal of the octree. For example, red dots may indicate tiles that have been valuated; blue dots may indicate the minimum and maximum resolution thresholds; yellow may show the octree itself.

Data Outline: this setting can show tiles loaded in main memory. The outlines of tiles of full resolution can be drawn, for example, with a brighter yellow than tiles of lower resolution.

Slice Texture: this setting can enable or disable display of slice texturing.

Tile Outline: This setting can enable drawing tile outlines for all primitives. For example, the outlines of tiles of full resolution may be drawn with a brighter grey for the volume, and a brighter green for the slices.

Draw Tiles: this setting can enable or disable display of tile texturing.

Load Unload Tiles: This setting can enable display of loaded tiles (e.g., in red) and unloaded tiles (e.g., in blue) in texture memory.

Fake Data: In one implementation, this setting allows fake data to be used instead of the real data during data load into main memory. The fake data can be programmatically generated and is designed to illustrate features of Large Data Management (LDM) (data may have to be reloaded to see the fake data).

View Point Refinement: This setting can enable the resolution & perspective engine 948 to load tiles of higher resolution closer to the apparent viewpoint.

View Culling: This setting controls a default to not load tiles located outside of the view frustum.

Tile Size: This setting specifies that when the data has not been pre-converted (in which case the tile size is fixed), the tile size will be converted on the fly.

Rendering style: One or more settings, such as radio buttons, specify that the volume can be rendered in different styles. The styles may include: standard volume rendering, pre-integrated volume rendering, lighted volume rendering, lighted pre-integrated volume rendering, isosurfaces (only voxels of a given value are rendered), a skin (only outside faces of the volume cube are rendered), or an red-green-blue-alpha (RGBA) skin. RGBA textures are then used rather than indexed textures. Programmable shader support can be used for the pre-integrated and isosurface rendering styles.

Figure 28:
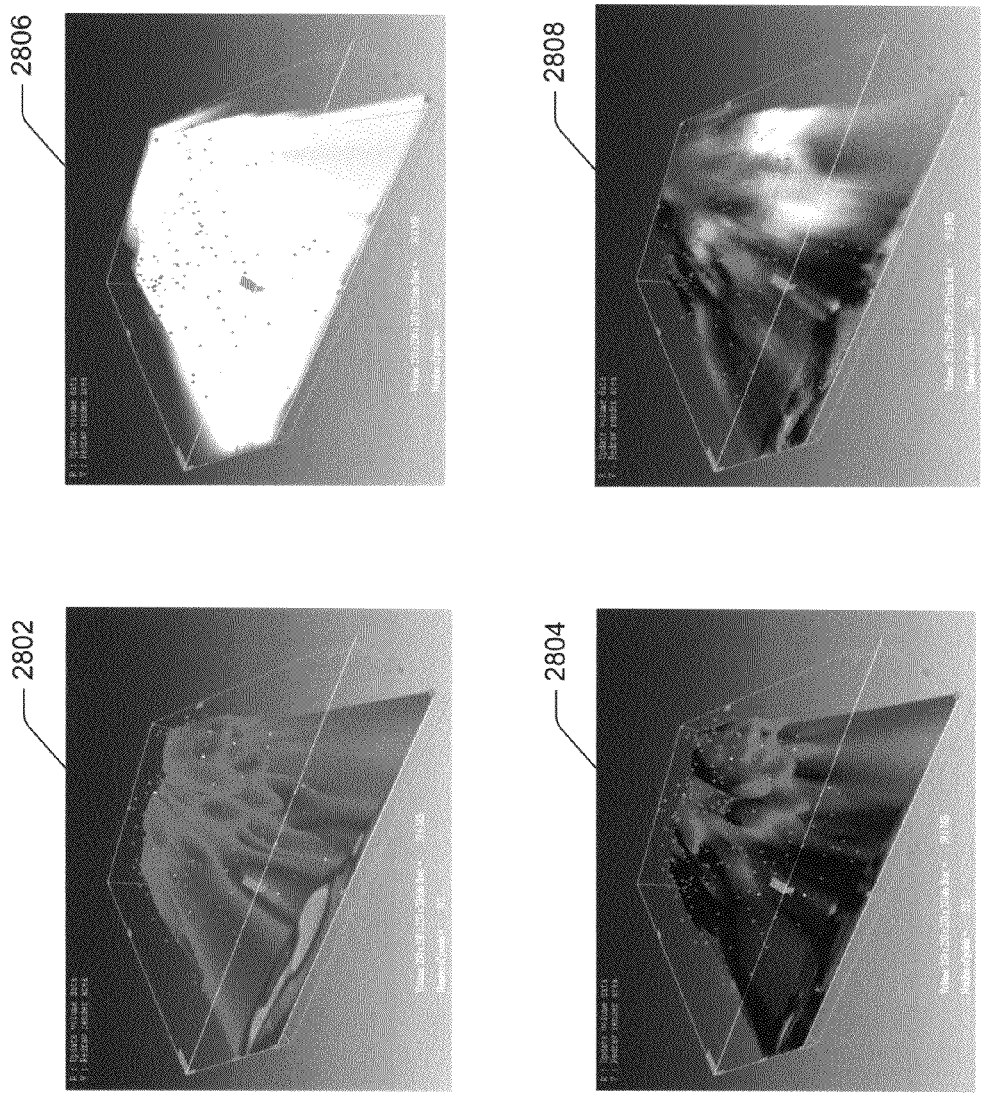
FIG. 28 is a diagram of example colored rendering styles of a volume probe, in which the color is analogized in black and white.

FIG. 28 shows four of the different rendering styles just described. Shown from top left to bottom right in FIG. 28 are Standard 2802, Pre-integrated 2804, Lighted 2806, and Lighted Pre-integrated 2808 volume rendering.

In one of the dialog boxes described above, or separately, a "pick profile window" may be provided, for example, in conjunction with controls for the interactive histogram engine 930. Picking on a slice object selects the first opaque voxel along the pick ray. The pick returns the value of the selected voxel, its IJK position in the volume, and its XYZ position in the 3-dimensional scene. Picking on a volume object returns the "profile" along the pick ray, which is a list of the values of all the voxels intersected by the pick ray.

Figure 29:
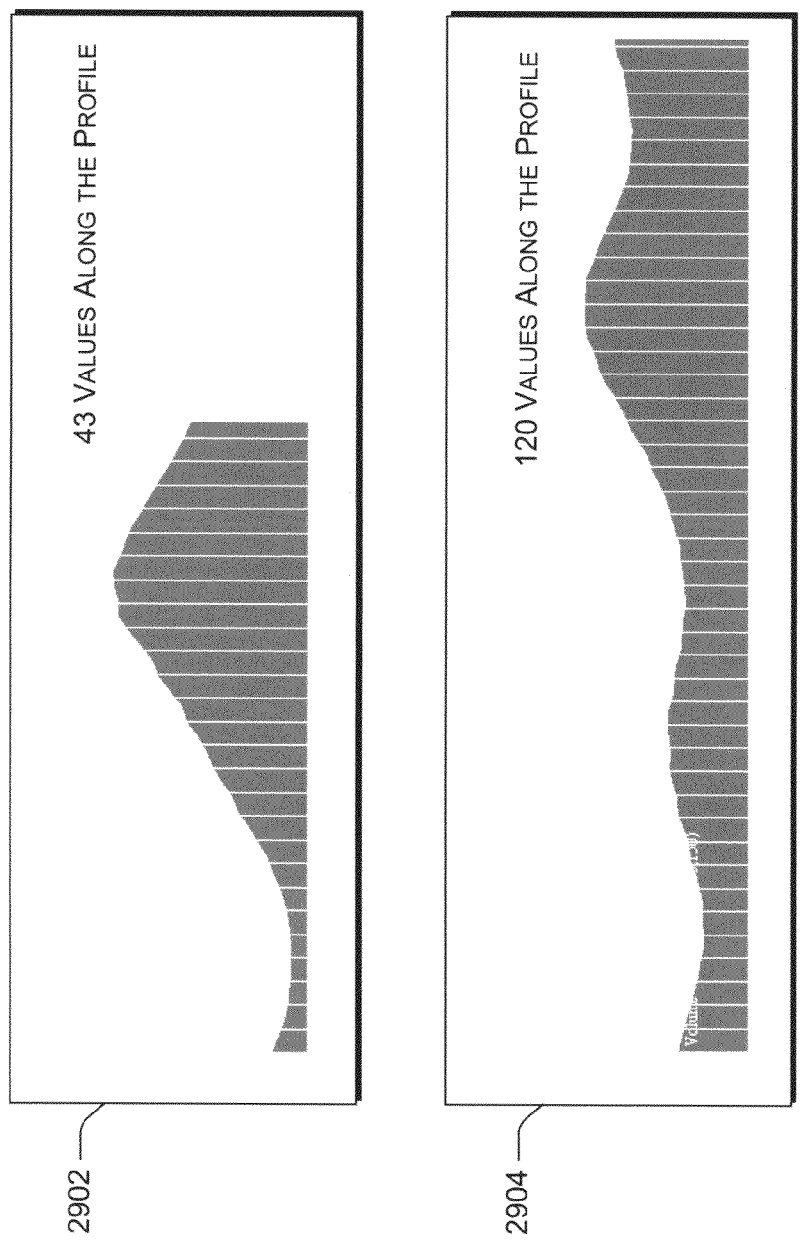
FIG. 29 is a diagram of an example histogram for analyzing concentration of property values in a selected part of a gridless geological model.

As shown in FIG. 29, an interactive histogram can be a graphical display of tabulated frequencies, e.g., the profile of values as picked along the pick ray, shown as bars. The interactive histogram may show what proportion of property value cases falls into each of multiple categories. The categories are usually specified as non-overlapping value ranges of the variable, i.e., the given property. The interactive histogram engine 930 can also construct a probability density function for display from the supplied or selected data.

The interactive histogram engine 930 can provide the interactive histogram through the picking operation, e.g., by the user selecting an arbitrary point on the object displayed on the screen. In one implementation, the number of voxels intersected decides the length of a line graph or histogram. In FIG. 29, for example, the first pick ray results in 43 values along the profile 2902, while the second pick ray results in 120 values along the profile 2904.

Example Methods

Figure 30:
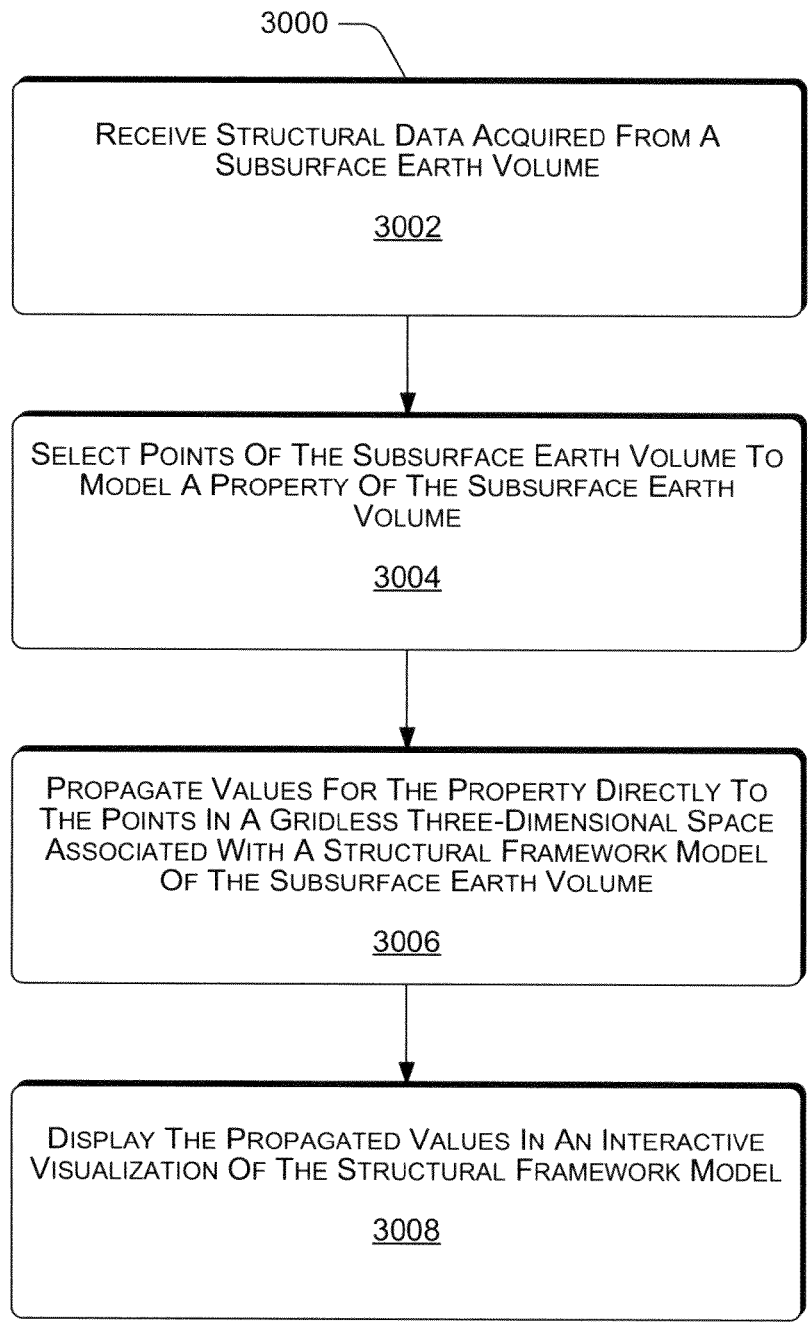
FIG. 30 is a flow diagram of an example method of performing gridless geological modeling.

FIG. 30 shows an example method of performing gridless geological modeling. In the flow diagram, the operations are summarized in individual blocks. The example method 3000 may be performed by hardware or combinations of hardware and software, for example, by the example gridless modeling engine 820.

At block 3002, structural data acquired from a subsurface earth volume is received.

At block 3004, points or locations of the subsurface earth volume are selected to model a property of the subsurface earth volume.

At block 3006, values for the property are propagated directly to the points in a gridless three-dimensional space associated with a structural framework model of the subsurface earth volume.

At block 3008, the propagated values are displayed in an interactive visualization of the structural framework model.

Figure 31:
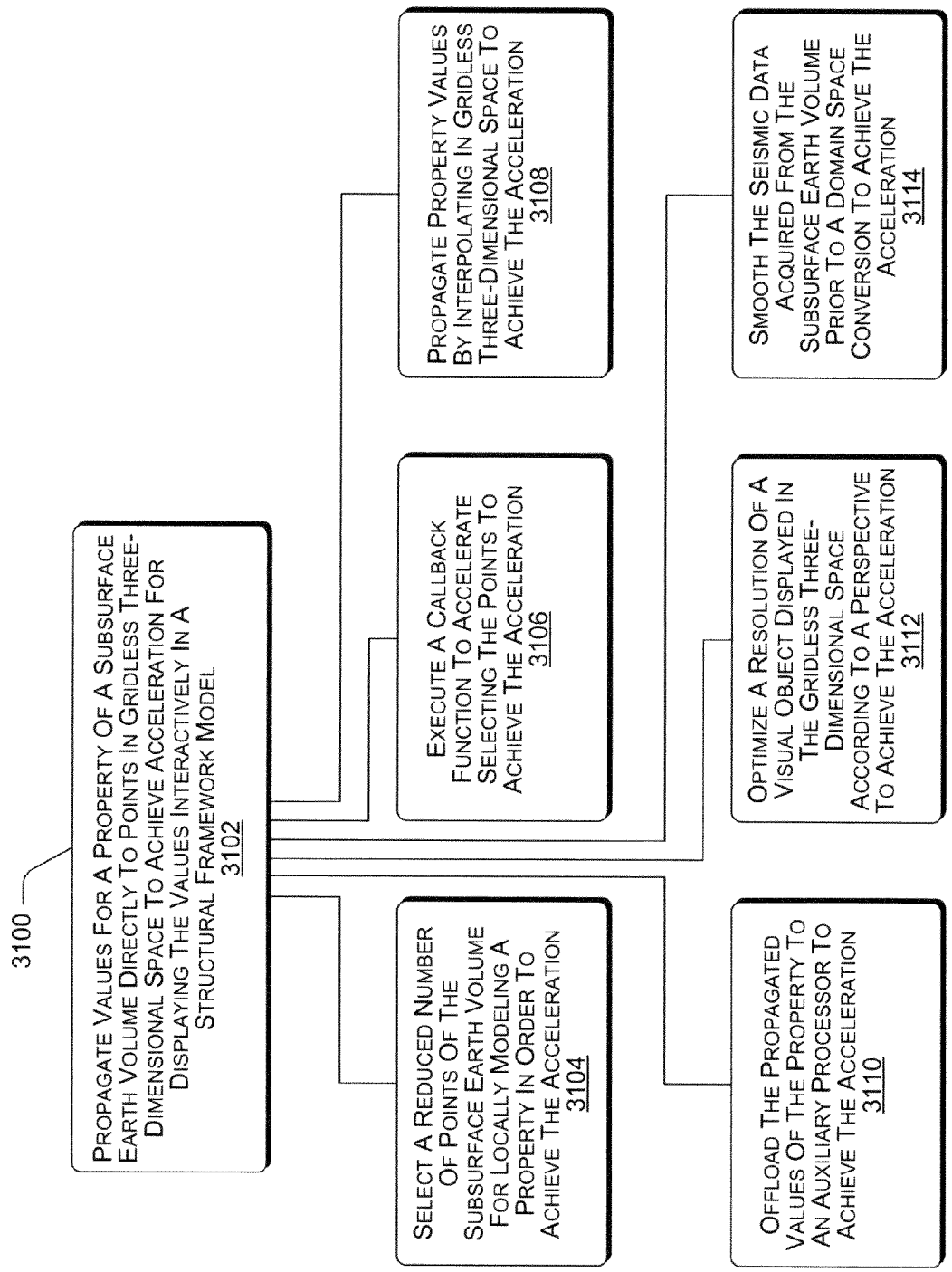
FIG. 31 is a flow diagram of an example method of accelerating modeling in gridless geological modeling.

FIG. 31 shows an example method of accelerating modeling in gridless geological modeling. In the flow diagram, the operations are summarized in individual blocks. The example method 3100 may be performed by hardware or combinations of hardware and software, for example, by the example gridless modeling engine 820.

At block 3102, values for a property of a subsurface earth volume are propagated directly to points in gridless three-dimensional space to achieve acceleration for displaying the values interactively in a structural framework model.

One or more of the following steps may be added to achieve the acceleration:

At block 3104, a reduced number of the points of the subsurface earth volume are selected for locally modeling a property in order to achieve the acceleration.

At block 3106, a callback function is executed to accelerate selecting the points in order to achieve the acceleration.

At block 3108, property values are propagated by interpolating in gridless three-dimensional space in order to achieve the acceleration.

At block 3110, the propagated values of the property are propagated to an auxiliary processor to achieve the acceleration.

At block 3112, a resolution of a visual object portrayed by the points is optimized according to a view perspective to achieve the acceleration.

At block 3114, the structural data acquired from the subsurface earth volume is smoothed prior to a domain space conversion to achieve the acceleration.

Figure 32:
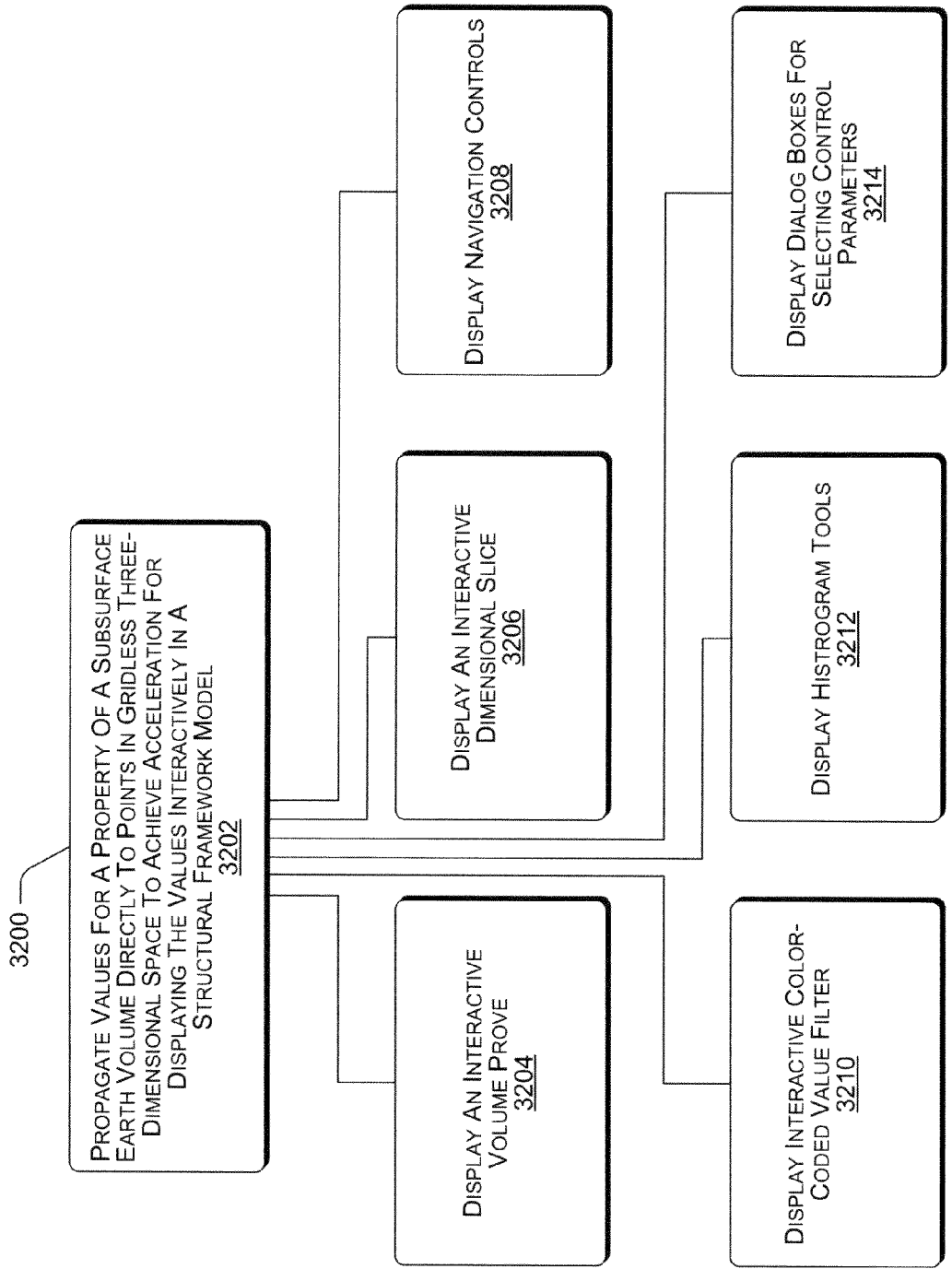
FIG. 32 is a flow diagram of an example method of extending an interactive graphical user interface (GUI) in gridless geological modeling.

FIG. 32 shows an example method of extending an interactive graphical user interface (GUI) in gridless geological modeling. In the flow diagram, the operations are summarized in individual blocks. The example method 3200 may be performed by hardware or combinations of hardware and software, for example, by the example gridless modeling engine 820.

At block 3202, values for a property of a subsurface earth volume are propagated directly to points in gridless three-dimensional space to achieve acceleration for displaying the values interactively in a structural framework model.

One or more of the following steps may be added to extend an interactive graphical user interface:

At block 3204, an interactive volume probe is displayed.

At block 3206, an interactive dimensional slice is displayed.

At block 3208, navigation controls are displayed.

At block 3210, an interactive color-coded property value filter is displayed.

At block 3212, histogram tools are displayed.

At block 3214, dialog boxes for selecting control parameters are displayed.

Figure 33:
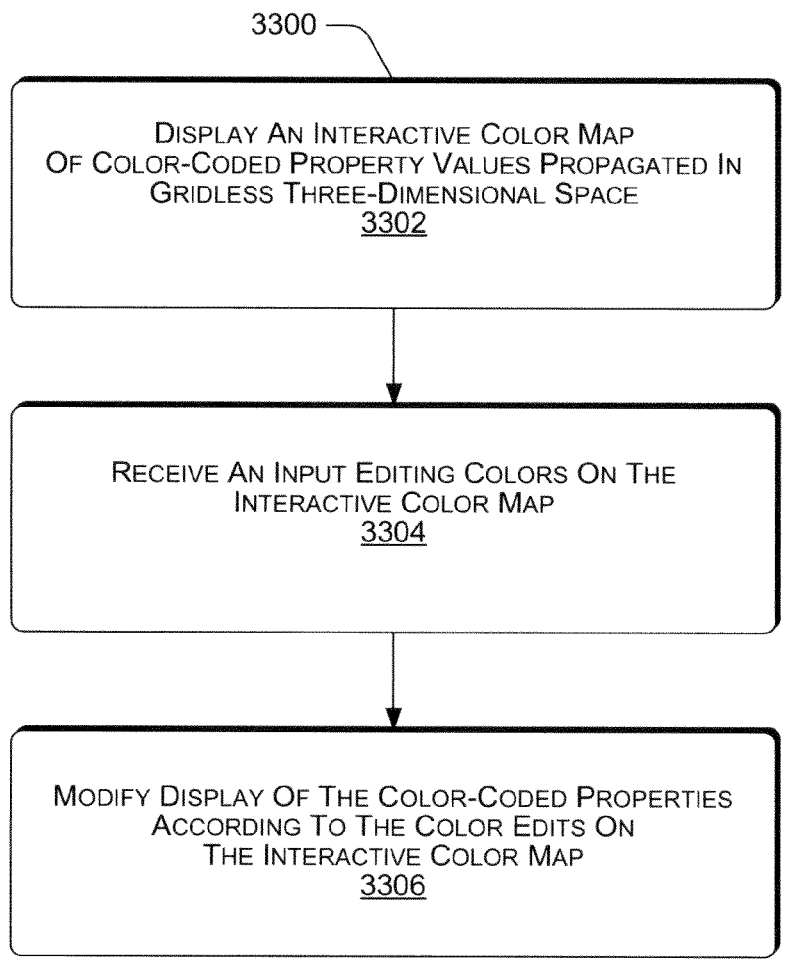
FIG. 33 is a flow diagram of an example method of viewing property values in gridless geological modeling using an interactive color map.

FIG. 33 shows an example method of viewing property values in gridless geological modeling using an interactive color map. In the flow diagram, the operations are summarized in individual blocks. The example method 3300 may be performed by hardware or combinations of hardware and software, for example, by the example gridless modeling engine 820.

At block 3302, an interactive color map of color-coded property values propagated in three-dimensional space is displayed.

At block 3304, an input editing a color selection on the interactive color map is received.

At block 3306, display of the color-coded properties is modified according to the color edits on the interactive color map.

Figure 34:
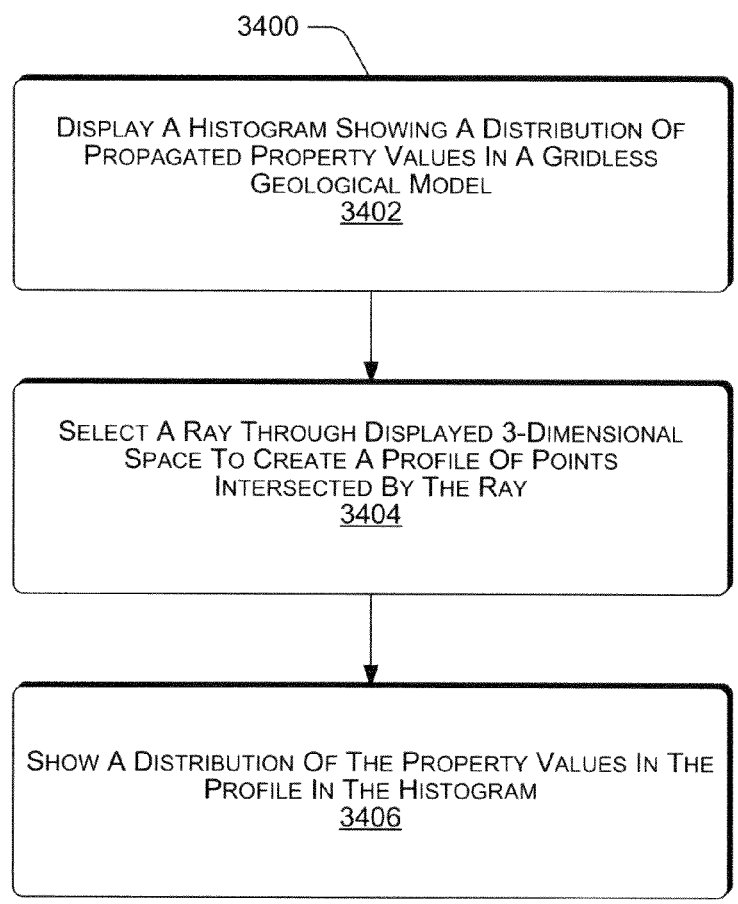
FIG. 34 is a flow diagram of an example method of showing a distribution of property values in a gridless geological model in a histogram.

FIG. 34 shows an example method of showing a distribution of property values in a gridless geological model in a histogram. In the flow diagram, the operations are summarized in individual blocks. The example method 3400 may be performed by hardware or combinations of hardware and software, for example, by the example gridless modeling engine 820.

At block 3402, a histogram showing a distribution of propagated property values in a gridless geological model is displayed.

At block 3404, a ray through the displayed three-dimensional space is selected to create a profile of points intersected by the ray.

At block 3406, a distribution of the property values in the profile is shown in the histogram.

Figure 35:
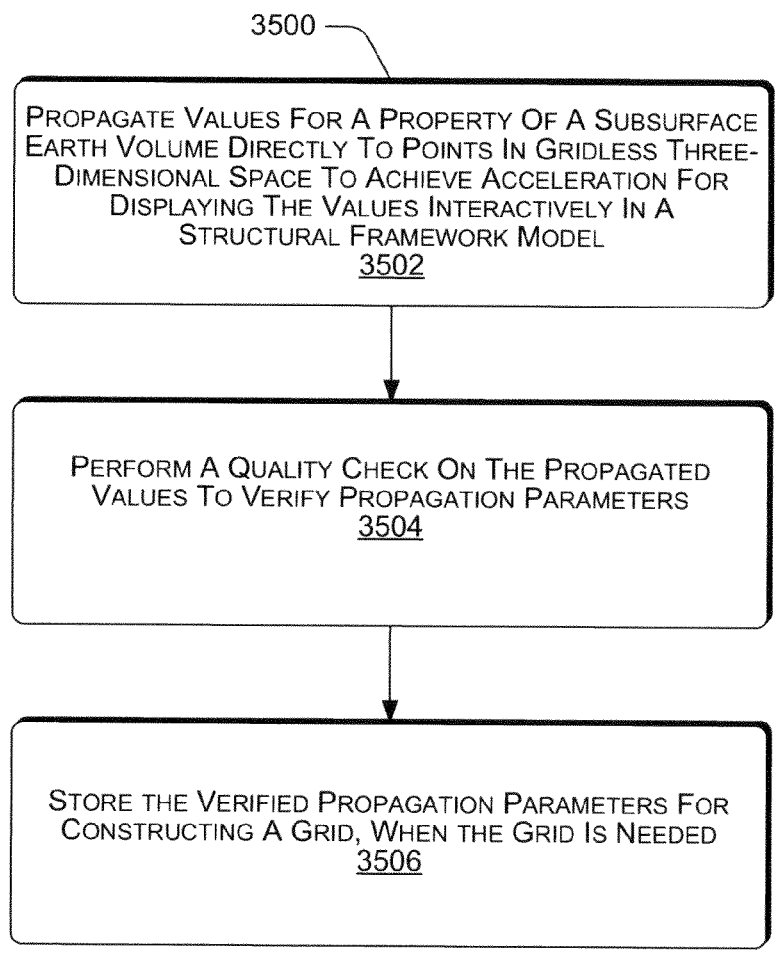
FIG. 35 is a flow diagram of an example method of verifying propagation parameters to accelerate construction of a grid for geological modeling.

FIG. 35 shows an example method of verifying propagation parameters to accelerate construction of a grid for geological modeling. In the flow diagram, the operations are summarized in individual blocks. The example method 3500 may be performed by hardware or combinations of hardware and software, for example, by the example gridless modeling engine 820.

At block 3502, values for a property of a subsurface earth volume are propagated directly to points in gridless three-dimensional space to achieve acceleration for displaying the values interactively in a structural framework model.

At block 3504, a quality check is performed on the propagated values to verify propagation parameters.

At block 3506, the verified propagation parameters are stored for later constructing a grid, when the grid is needed.

Conclusion

Although exemplary systems and methods have been described in language specific to structural features and/or methodological acts, it is to be understood that the subject matter defined in the appended claims is not necessarily limited to the specific features or acts described. Rather, the specific features and acts are disclosed as exemplary forms of implementing the claimed systems, methods, and structures.

The invention claimed is:

1. A method, comprising:
receiving structural data acquired from a subsurface earth volume;
selecting points of the subsurface earth volume to model a property of the subsurface earth volume;
propagating values for the property directly to the points in a gridless three-dimensional space associated with a structural framework model of the subsurface earth volume, wherein propagating the values comprises:
transforming at least a portion of the seismic data from a real-space domain to a depositional space domain; and
interpolating the seismic data in the depositional space domain at least partially along a sub-horizon to produce interpolated seismic data;
displaying the propagated values in an interactive visualization of the structural framework model;
responding to user input with dynamic gridless browsing of the property displayed in the gridless three-dimensional space in real-time or near real-time; and
optimizing a propagation function to achieve an acceleration enabling interactive gridless modeling, wherein the optimizing comprises using $$f(x) = p(x) + \sum_{i=1}^{N} \lambda_i \Phi(\|x - x_i\|),$$

$$f(x_i) = w_i, i = 1, \ldots, N,$$

$$\sum_{i=1}^{n} \lambda_i q(x_i) = 0, \forall_q \in \pi_k^3,$$

wherein p(x) is a polynomial of low-degree k, $\{\lambda_i\}$ is a set of weights and $\Phi$ is a fixed radial function from $R^+ \to R$.

2. The method as recited in claim 1, further comprising color-coding the propagated values of the property for display.

3. The method as recited in claim 1, wherein the property is a physical property, a geological property, a chemical property, or a combination thereof, of the subsurface earth volume.

4. The method as recited in claim 1, further comprising modeling multiple properties of the subsurface earth volume in the gridless three-dimensional space.

5. The method as recited in claim 1, further comprising displaying the propagated values and the gridless three-dimensional space as a two-dimensional visualization of the propagated values on a surface of a two-dimensional display.

6. The method of claim 1, wherein propagating the values further comprises transforming the interpolated seismic data back to the real-space domain.

7. A system for performing gridless geological modeling, the system comprising:
a computer comprising at least one processor;
a memory storing a program of instructions;
a structural data engine to process seismic data acquired from a subsurface earth volume with respect to a current stratigraphy;
a point selector to designate points in a structural framework model for displaying a property of the subsurface earth volume;
an interpolation engine to propagate values of the property directly in a gridless three-dimensional space associated with the structural framework model;
a display engine to show the propagated values in an interactive rendering of the structural framework model; and
an acceleration engine to increase a speed of the point selector, the interpolation engine, and the display engine to achieve an acceleration enabling interactive gridless modeling,
wherein the interactive gridless modeling responds to user input with dynamic gridless browsing of the property displayed in the gridless three-dimensional space in real-time or near real-time, wherein the interpolation engine optimizes a propagation function to achieve the acceleration, and wherein the interpolation engine propagates points using $$f(x) = p(x) + \sum_{i=1}^{N} \lambda_i \Phi \frac{(\|x - x_i\|)}{r},$$

$$f(x_i) = w_i, i = 1, \ldots, N,$$

$$\sum_{i=1}^{n} \lambda_i q(x_i) = 0, \forall_q \in \pi_k^3,$$

to achieve the acceleration, wherein p(x) is a polynomial of low-degree k, $\{\lambda_i\}$ is a set of weights and $\Phi$ is a fixed radial function from $R^+ \to R$.

8. The system as recited in claim 7, wherein the points selector designates a reduced number of points of the structural framework model for locally modeling a property in order to achieve the acceleration.

9. The system as recited in claim 8, wherein the points selector executes a callback function to accelerate selecting the points to achieve the acceleration.

10. The system as recited in claim 7, further comprising a computation offloader to send calculation of the property values to be propagated to an auxiliary processor to achieve the acceleration, wherein the auxiliary processor is a graphics processing unit, an auxiliary central processing unit, a coprocessor, a parallel processor, or a combination thereof.

11. The system as recited in claim 7, further comprising a resolution & perspective engine to optimize a resolution of a visual object displayed in the gridless three-dimensional space according to a camera perspective in order to achieve the acceleration by reducing a number of points to visually render.

12. The system as recited in claim 7, further comprising a smoothing engine to minimize noise in seismic data acquired from the subsurface earth volume prior to a domain space conversion to achieve the acceleration.

13. The system as recited in claim 7, further comprising a quality check manager for:
   performing a quality check on a sample of the propagated values to verify propagation parameters;
   storing the verified propagation parameters; and
   wherein the stored and verified propagation parameters enable grid generation guided by the verified propagation parameters, when the grid is needed for a simulation or for a modeling operation.

14. The system as recited in claim 13, wherein the system populates a three-dimensional grid with values for a property, an individual value for the property calculated for each cell of the three-dimensional grid, wherein values of the property have been quality checked in the gridless three-dimensional space before populating the three-dimensional grid.

15. The system as recited in claim 7, wherein the system generates control signals based on the propagated properties, the control signals applied to perform:
   controlling geophysical exploration;
   controlling hydrocarbon production;
   controlling hardware, including one of machinery, injection and production wells, reservoirs, petroleum fields, transport systems, and delivery systems; or
   a combination thereof.

16. A non-transitory machine readable storage device embodying a set of machine executable instructions that when executed by a machine perform a method for gridless geological modeling, the method comprising:
   processing seismic data and well logs describing a subsurface earth volume;
   designating points in a structural framework model of the subsurface earth volume to model a property of the subsurface earth volume;
   calculating values of the property at the points in a gridless three-dimensional space of the structural framework model, wherein calculating the values comprises:
      transforming at least a portion of the seismic data from a real-space domain to a depositional space domain consistent with a current stratigraphy; and
      interpolating the seismic data in the depositional space domain at least partially along a sub-horizon to produce interpolated seismic data;
   modeling the calculated values in an interactive display of the structural framework model;
   interactively browsing the calculated values modeled in the interactive display of the structural framework model, wherein the interactive browsing uses a volume probe, a dimensional slice probe, navigation controls, panning and zooming controls, image rotation controls, or a combination thereof, wherein interactively browsing comprises responding to user input with dynamic gridless browsing of a property displayed in the gridless three-dimensional space in real-time or near real-time; and
   optimizing a propagation function to achieve an acceleration enabling interactive gridless modeling, wherein the optimizing comprises using $$f(x) = p(x) + \sum_{i=1}^{N} \lambda_i \Phi \frac{(\|x - x_i\|)}{r},$$

$$f(x_i) = w_i, i = 1, \ldots, N,$$

$$\sum_{i=1}^{n} \lambda_i q(x_i) = 0, \forall_q \in \pi_k^3,$$

wherein p(x) is a polynomial of low-degree k, $\{\lambda_i\}$ is a set of weights and $\Phi$ is a fixed radial function from $R^+ \rightarrow R$.

17. The machine readable storage device as recited in claim 16, further comprising instructions for:
   displaying an interactive color map of color-coded property values propagated in the gridless three-dimensional space to represent the subsurface earth volume; and
   editing the color map to filter the color-coded property values to be displayed in the interactive display of the structural framework model.

18. The machine readable storage device as recited in claim 16, further comprising instructions for:
   displaying a histogram showing a distribution of the propagated property values in different ranges for the property values;
   selecting a ray through the displayed three-dimensional space to create a profile of points intersected by the ray; and
   showing the property values of the points in the profile in the histogram.

19. The machine readable storage device as recited in claim 16, further comprising instructions for:
   displaying a dialog on a user interface for receiving user input to specify parameters for one of a dimensional slice probe, a volume probe, an interpolation technique, or a visual rendering style.

20. The machine readable storage device of claim 16, wherein calculating the values further comprises transforming the interpolated seismic data back to the real-space domain.

* * * * *